United States Patent
Yoshida et al.

(10) Patent No.: US 6,665,831 B1
(45) Date of Patent: Dec. 16, 2003

(54) UNEQUAL ERROR PROTECTION IN MULTI-CARRIER TRANSMISSION

(75) Inventors: Makoto Yoshida, Kawasaki (JP); Eizou Ishizu, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/478,603

(22) Filed: Jan. 6, 2000

(30) Foreign Application Priority Data

Mar. 31, 1999 (JP) .......................................... 11-091884

(51) Int. Cl.$^7$ ........................ H03M 13/00; H03M 13/03
(52) U.S. Cl. ....................................... 714/774; 714/790
(58) Field of Search ................ 714/774, 790, 714/751

(56) References Cited

U.S. PATENT DOCUMENTS

| | | | |
|---|---|---|---|
| 4,047,151 A | * 9/1977 | Rydbeck et al. | 714/774 |
| 5,467,132 A | 11/1995 | Fazel et al. | |
| 5,497,401 A | * 3/1996 | Ramaswamy et al. | 375/341 |
| 5,600,663 A | * 2/1997 | Ayanoglu et al. | 714/774 |
| 5,691,992 A | * 11/1997 | Molnar et al. | 714/752 |
| 5,699,365 A | * 12/1997 | Klayman et al. | 714/708 |
| 5,699,369 A | * 12/1997 | Guha | 714/774 |
| 5,729,526 A | * 3/1998 | Yoshida | 370/206 |
| 6,085,349 A | * 7/2000 | Stein | 714/778 |
| 6,108,810 A | * 8/2000 | Kroeger et al. | 714/790 |
| 6,247,158 B1 | * 6/2001 | Smallcomb | 714/786 |
| 6,285,681 B1 | * 9/2001 | Kolze et al. | 370/442 |
| 6,292,917 B1 | * 9/2001 | Sinha et al. | 714/752 |
| 6,345,377 B1 | * 2/2002 | Kroeger et al. | 714/790 |
| 6,347,122 B1 | * 2/2002 | Chen et al. | 375/262 |
| 6,400,728 B1 | * 6/2002 | Ott | 370/465 |

FOREIGN PATENT DOCUMENTS

| | | |
|---|---|---|
| EP | 0 540 232 | 10/1991 |
| JP | 2-84836 | 3/1990 |

OTHER PUBLICATIONS

Fazel, K. and Lhuillier, J.J.; Application of unequal error protection codes on combined source–channel coding of images; Conference Record 1990 IEEE International Conference on Communications (ICC); Including Supercomm Technical Sessions (SUPERCOMM/ICC '9.*

(List continued on next page.)

Primary Examiner—Albert Decady
Assistant Examiner—Joseph D. Torres
(74) Attorney, Agent, or Firm—Katten Muchin Zavis Rosenman

(57) ABSTRACT

A method of providing unequal error protection in a multi-carrier transmission, includes the steps of coding data for a multi-carrier-symbol duration by a coding process of a given minimum code distance, the given minimum code distance being a minimum of a distance between two codes that is measured in multidimensional code space with N sub-carriers; and changing the minimum code distance for each multi-carrier-symbol duration by changing the coding process.

9 Claims, 19 Drawing Sheets

OTHER PUBLICATIONS

Calderbank, A.R. and Seshadri, N.; Multilevel codes for unequal error protection; IEEE Transactions on Information Theory; vol.: 39 Issue: Jul. 4, 1993, Page(s): 1224–1248.*

Morelos–Zaragoza, R.H. and Shu Lin; Unequal error protection QPSK modulation codes; Singapore ICCS/ISITA '92. 'Communications on the Move', 1990 Page(s): 1121–1125 vol. 3.*

Barton, M.; Unequal error protection for wireless ATM applications; Global Telecommunications Conference 1996 (GLOBECOM '96); Communications: The Key to Global Prosperity, vol.:3 , 1996 Page(s): 1911–1915.*

Zheng, H.; Raghupathy, A. and Liu, K.J.R.; A new loading algorithm for image transmitting over spectrally shaped channels: combined source coding and multicarrier modulation approach; Conference Record of the Thirty–Second Asilomar Conference on Signals, S.*

Zheng, H. and Liu, K.J.R.; Parallel transmission framework for layered coded multimedia data over spectrally shaped channels; This paper appears in: IEEE International Conference on Communications1999; On page(s): 1678–1682 vol. 3.*

Haitao Zheng and Liu, K.J.R.; Robust image and video transmission over spectrally shaped channels using multicarrier modulation; IEEE Transactions on Multimedia vol.: 1 Issue: 1 , Mar. 1999 Page(s): 88–103.*

* cited by examiner

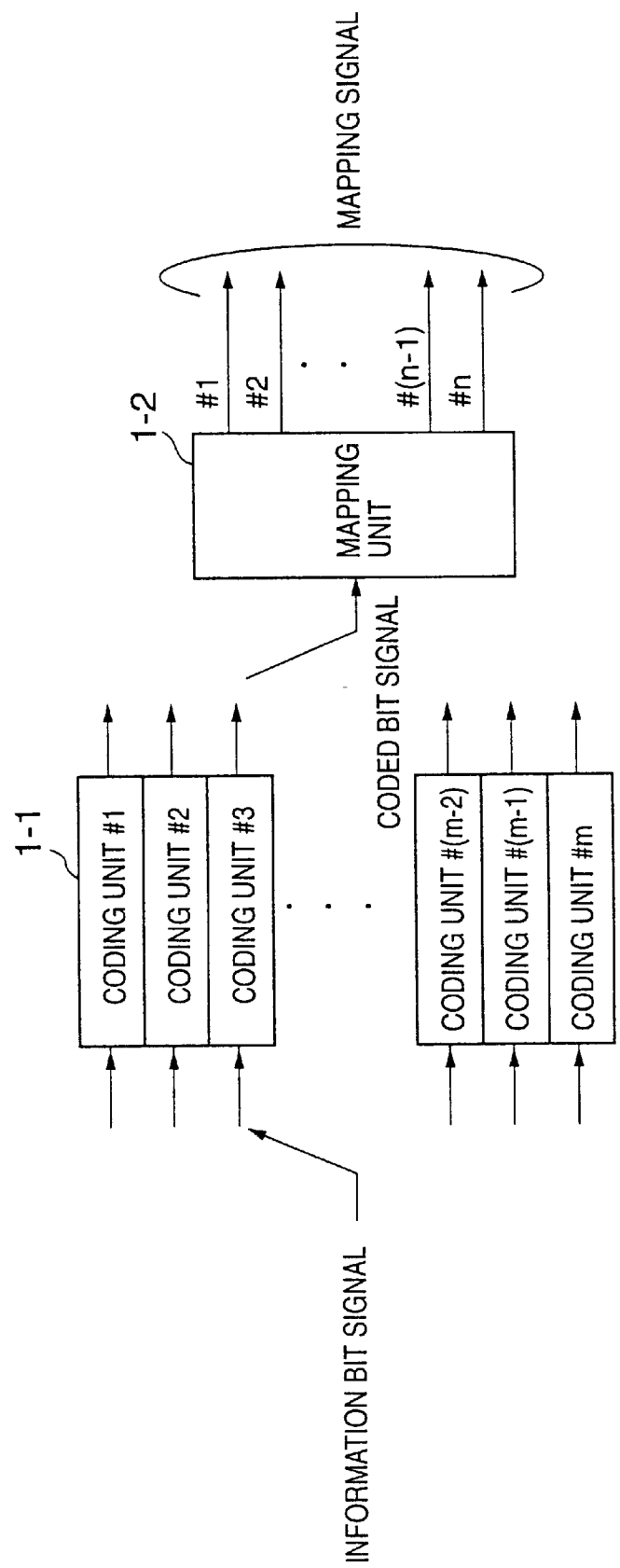

FIG. 10

| INPUT | OUTPUT | INPUT | OUTPUT |
|---|---|---|---|
| 0000 | 00000011 | 1000 | 10000100 |
| 0001 | 00011101 | 1001 | 10011010 |
| 0010 | 00101110 | 1010 | 10101001 |
| 0011 | 00110000 | 1011 | 10110111 |
| 0100 | 01001000 | 1100 | 11001111 |
| 0101 | 01010110 | 1101 | 11010001 |
| 0110 | 01100101 | 1110 | 11100010 |
| 0111 | 01111011 | 1111 | 11111100 |

UNEQUAL ERROR PROTECTION IN MULTI-CARRIER TRANSMISSION

BACKGROUND OF THE INVENTION

1. Field of the Invention

The present invention generally relates to a method of providing unequal error protection in a multi-carrier transmission, and relates to a coding device and a decoding device for performing such a method. The present invention particularly relates to a method of providing unequal error protection by providing different channel qualities for different media in multimedia transmission using a plurality of carriers so as to achieve efficient transmission, and relates to a coding device and a decoding device for performing such a method.

2. Description of the Related Art

In broadband wireless communication, multi-path frequency selective fading is a major factor to deteriorate channel quality, and multi-carrier transmission is a well known scheme to cope with this problem.

FIGS. 19A and 19B are illustrative drawings for explaining the multi-carrier transmission.

As shown in FIG. 19A, the multi-carrier transmission divides a transmission band into a plurality of carrier frequencies f1 through fN (hereinafter called sub-carriers), and each carrier frequency is modulated to transmit data. This produces a frequency diversity effect, which compensates for degradation of transmission quality caused by frequency selective fading, thereby achieving a high-quality wireless communication.

When sub-carriers f1 through fN are orthogonal to each other, each modulated signal can be extracted on the receiver side without any degradation even if carrier spectrums overlap with each other as shown in FIG. 19B. This makes it possible to make use of a narrower frequency band. Such a scheme is called orthogonal frequency division multiplex (OFDM), and is one of the variations of the multi-carrier transmission.

One of the problems of the multi-carrier transmission is an increase in a peak envelope power of a transmission signal or an increase in a ratio of the peak to an average power. In a transmission system having a large peak power, a linear amplifier having a broad range of amplifying levels is necessary in order to maintain linearity of the system. Such a broad-range linear amplifier is generally expensive, and is not attractive in terms of power efficiency. When an inexpensive narrow-range linear amplifier is used, a non-linearity distortion is generated in a saturation region, resulting in a degradation of system performance. These problems impeded an effort to use the multi-carrier transmission in practice.

Measures to suppress the peak power mainly fall into either one of two different categories. One is to place a restriction on input-signal patterns used in the multi-carrier transmission, and the other is to limit the output level of modulated signals of the multi-carrier transmission.

The former measure eliminates an input signal pattern having large peak power due to coding. This insures that the peak power of a transmission signal stays below a certain threshold level. No degradation in performance occurs when this measure is taken. Further, when the minimum code distance is larger than the minimum distance between a signal, a bit error rate can be reduced.

The later measure utilizes the fact that there is only a small probability of having a signal pattern with such a large peak power as to generate a non-linear distortion. By utilizing this fact, when peak power exceeding a predetermined threshold is detected, an excess portion of the peak power is cut off or clipped off, for example. This measure inevitably result in an increase of a side-robe level due to the non-linear distortion. That is, inter-carrier interference is generated. This measure thus entails a degradation in performance.

Another method is to normalize a signal to a threshold level by lowering the level of an entire envelope of the transmission signal when peak power exceeding the threshold value is detected. This method results in a decrease in the signal-to-noise ratio of the received signal, thereby degrading the performance.

In consideration of these, the former measure is preferable for the purpose of achieving broadband high-quality wireless transmission. In high-speed broadband wireless communication, further, multi-media mobile access needs to be achieved so as to handle various media such as image data and audio data.

In multi-media communication, each data type requires different channel quality. In general, channel quality depends on an employed coding method. However, audio transmission requires a bit error rate in the order of $10^{-2}$, for example, while the transmission of image data requires a bit error rate lower than $10^{-5}$.

In packet communication, further, control data for the packets requires a higher quality than is required for the data information that contains the multi-media contents. This is because delivery of packets may fail if the control data contains error, and such a failure may cause an unexpected increase in the traffic load on the entire network. In order to prevent this, the control information requires a significantly lower bit error rate.

In order to meet these requirements, a plurality of coding methods having different levels of protection against bit errors may be employed so as to provide different channel qualities, thereby achieving efficient transmission. An unequal error protection method is known to be effective for this purpose.

The unequal error protection method, however, is not directed to the multi-carrier transmission. In other words, there is no unequal error protection method known to date that is directed to a coding process treating a set of multi-carrier symbols as one code word.

Accordingly, there is a need for an unequal error protection method which can provide different channel qualities for different data types in the multi-carrier transmission so as to improve transmission efficiency, and, also, can reduce peak power in the multi-carrier transmission.

SUMMARY OF THE INVENTION

Accordingly, it is a general object of the present invention to provide an unequal error protection method which can satisfy the need described above.

It is another and more specific object of the present invention to provide an unequal error protection method which can provide different channel qualities for different data types in the multi-carrier transmission so as to improve transmission efficiency, and, also, can reduce peak power in the multi-carrier transmission.

In order to achieve the above objects according to the present invention, a method of providing unequal error protection in a multi-carrier transmission includes the steps of coding data by a coding process of a given minimum code distance as measured in block codes comprised of modulated-signal points of sub-carriers, and changing the minimum code distance for each multi-carrier-symbol duration by changing the coding process.

According to one aspect of the present invention, the method as described above has the coding process thereof using a set of such codes that multi-carrier-modulated signal has a peak power lower than a predetermined threshold.

It is yet another object of the present invention to provide an encoder and decoder which can implement the unequal error protection method of the present invention.

In order to achieve the object described above according to the present invention, a coding device for providing unequal error protection in a multi-carrier transmission includes a plurality of coding units, each of which codes a corresponding data frame of an information bit signal by a coding process of a given minimum code distance specific to a corresponding coding unit so as to output a coded bit signal, a selector unit which successively selects one of said plurality of coding units, and outputs the coded bit signal supplied from the selected one of said plurality of coding units, and a mapping unit which maps the coded bit signal output from said selector unit to complex signals corresponding to the sub-carriers.

Further, a decoding device for decoding received signals corresponding to a plurality of sub-carriers transmitted in a multi-carrier-transmission system includes a timing control unit which generates data control signals such that each of the data control signals varies over time to present various patterns within a corresponding multi-carrier-symbol duration, a plurality of coding units, each of which codes a corresponding one of the data control signals by a coding process of a given minimum code distance specific to a corresponding coding unit so as to output a coded bit signal, a mapping unit which maps the coded bit signal output from a selected one of said plurality of coding units to complex signals corresponding to the sub-carriers, and a code-distance-calculation unit which calculates a code distance between the complex signals and the received signals with respect to each of the various patterns of the corresponding one of the data control signals within a corresponding multi-carrier-symbol duration, wherein one of the various patterns providing a smallest code distance is selected as a decoding result of the corresponding received signals.

Other objects and further features of the present invention will be apparent from the following detailed description when read in conjunction with the accompanying drawings.

BRIEF DESCRIPTION OF THE DRAWINGS

FIG. 1 is an illustrative drawing showing a basic configuration of an encoder according to the present invention;

FIG. 10 is a table showing relations between inputs and outputs of a coding unit;

DESCRIPTION OF THE PREFERRED EMBODIMENTS

In the following, a principle and embodiments of the present invention will be described with reference to the accompanying drawings.

FIG. 1 is an illustrative drawing showing a basic configuration of an encoder according to the present invention.

The encoder of FIG. 1 includes a plurality of coding units 1-1 and a mapping unit 1-2. The coding units 1-1 receive an information bit signal, and encode the information bit signal to generate coded bit signals. The mapping unit 1-2 receives the coded bit signals, and outputs mapping signals to modulate respective sub-carriers.

We assume that transmission of the information bit signal is performed by using m different channel qualities.

Figure 2A:
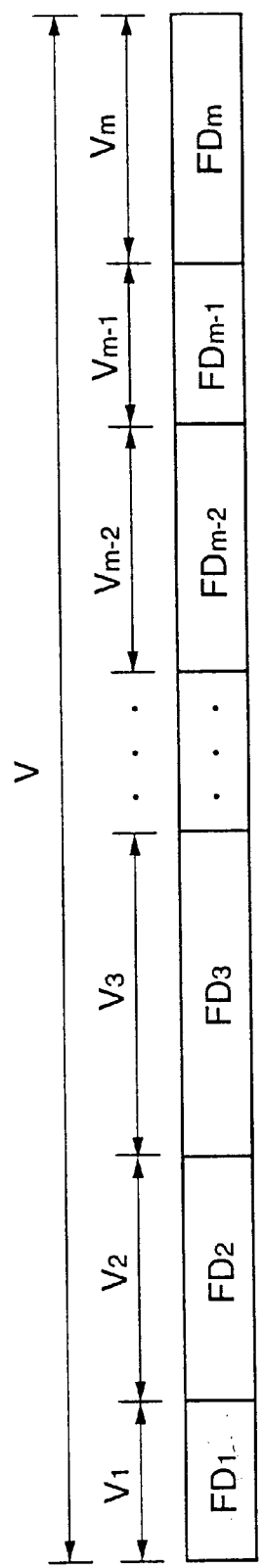
FIG. 2A is an illustrative drawing showing a data-frame format of an information bit signal supplied to coding units of FIG. 1.

FIG. 2A is an illustrative drawing showing a data-frame format of the information bit signal supplied to the coding units.

When the information bit signal is to be transmitted by using m different channel qualities, the information bit signal has m data sub-frames $FD_1$ through $FD_m$. In FIG. 2A, $v_1$ through $v_m$ indicate the number of bits included in the data sub-frames $FD_1$ through $FD_m$, respectively. A total number V of included bits is represented as:

$$V = \Sigma_{i=1}^{m}\{v_i\} \quad (1)$$

where $\Sigma_{i=1}^{m}\{\ \}$ indicates a sum of the contents in the brackets with respect to the index i from 1 to m. The same notation will be used hereinafter in the specification.

The coding units 1-1 of FIG. 1 receive respective data sub-frames of the information bit signal. Namely, an input to the coding units 1-1 is switched so as to selectively supply the data sub-frames $FD_1$ through $FD_m$ to the respective coding units 1-1. Each of the coding units 1-1 encodes the supplied data according to the required channel quality, so that the coding units 1-1 accord the data sub-frames $FD_1$ through $FD_m$ with unequal error protection against bit errors.

The coding units 1-1 attend to the coding of data by a unit of multi-carrier symbol, and outputs the coded bit signals with respect to n sub-carriers. In response, the mapping unit 1-2 generates mapping signals for modulating the n sub-carriers according to modulation schemes predetermined for the respective data sub-frames $FD_1$ through $FD_m$. Here, the mapping signals are complex signals (I ch/Q ch).

Figure 2B:
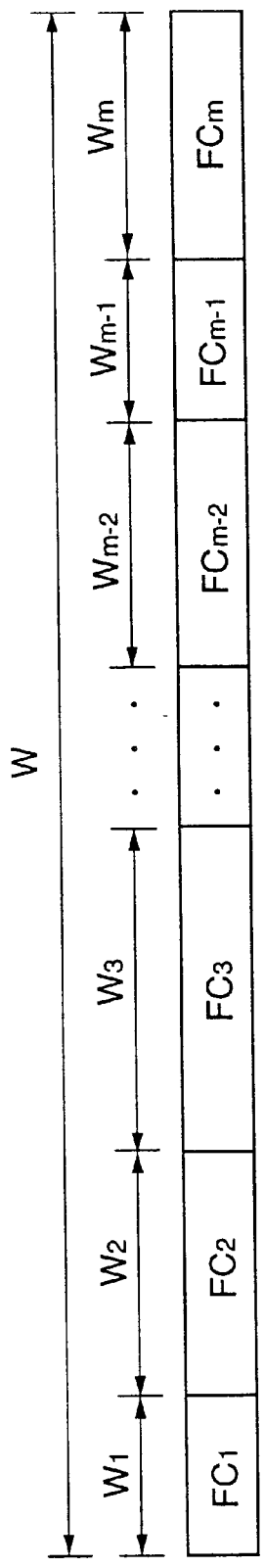
FIG. 2B is an illustrative drawing showing a code-frame format of coded bit signals generated by the coding units.

FIG. 2B is an illustrative drawing showing a code-frame format of the coded bit signals generated by the coding units. The code-frame format includes m code sub-frames $FC_1$ through $FC_m$.

In FIG. 2B, $w_1$ through $w_m$ indicate the number of bits included in the code sub-frames $FC_1$ through $FC_m$, respectively, and W indicates a total number of the bits. A number of bits $w_i$ of a code sub-frame $FC_i$ and the total number W of the bits are represented as:

$$w_i = n \times B_i \times \delta_i (1 \leq i \leq m) \tag{2}$$

$$W = \Sigma_{i=1}^{m} \{w_i\} \tag{3}$$

where $B_i$ indicates a sub-carrier modulation level (bits/symbol) of the coded sub-frame $FC_i$, and $\delta_i$ indicates a number of symbols constituting the coded sub-frame $FC_i$.

When a coding rate of the i-th coding unit 1-1 is $R_i$, the number of bits $w_i$ of the code sub-frame $FC_i$ and the number of bits $v_i$ of a data sub-frame $FD_i$ are related as:

$$R_i = v_i / w_i (1 \leq i \leq m) \tag{4}$$

The multi-carrier transmission system using n sub-carriers has n channels, each of which has a transmission rate that is 1/n of the transmission rate of the single-carrier transmission. The n channels together achieve parallel transmission of data. Such a multi-carrier transmission system treats a n-dimensioinal signal space as one codeword where the n-dimensional signal space is generated for one symbol duration (such a duration is referred to as a 1 FFT symbol duration in the case of the OFDM method).

A n-dimensional code space $C_n$ represented by a code c(i) is mapped onto an output-code-sequence vector S(c(i)) in the signal space vector S generated by one multi-carrier symbol. Here, the output-code-sequence vector S(c(i)) is represented as:

$$S(c(i)) = \{S_1(c(i)), S_2(c(i)), \cdots, S_n(c(i))\} \tag{5}$$

where $S_k(c(i))$ is a complex signal point of a k-th carrier ($1 \leq k \leq n$) with respect to the code c(i), and i corresponds to input information.

When M indicates a modulation level of each carrier, each carrier represents $2^M$ bit patterns of information. For n carriers, information i represents a total of $2^{nM}$ bit patterns (i.e., codewords).

In this case, a code distance $d_{ij}$ between two different codes is represented as:

$$d_{ij}^2 = |c(i) - c(j)|^2$$

$$= \Sigma_{k=1}^{n} \{|S_k(c(i)) - S_k(c(j))|^2\} \tag{6}$$

Accordingly, a minimum code distance (power) $d_{min}^2$ between codes is represented as:

$$d_{min}^2 = \min \{d_{ij}^2\} \tag{7}$$

Where a minimum distance (power) between signals in each carrier is denoted as $d^2$, use of all the codes $\{C_n\}$ as transmission codes results in $d_{min}^2 = d^2$.

The present invention uses m different partial sets of the code space $C_n$ as output codes generated in one symbol duration, thereby producing symbols having different minimum code distances.

Namely, where the minimum code distance in the entire code space Cn is denoted as $d_{min}^2(Cn)$ and the minimum code distance in a partial set $C_p$ of $C_n$ is denoted as $d_{min}^2(C_p)$, the present invention selects a partial code space $C_p$ for each input information such that $d_{min}^2(Cn) \leq d_{min}^2(Cp)$ is satisfied, thereby providing different channel qualities.

Where a coding rate when the entire code space $C_n$ is used is denoted as $R(C_n)$ and a coding rate when the partial set $C_p$ is employed is denoted as $R(C_p)$, it inevitably ensues that $R(C_n) \geq R(C_p)$.

A coding rate $R_i$ of a given sub-frame is represented by a ratio of the number $D_i$ of input bits to the number $C_i$ of output bits in one multi-carrier symbol duration.

$$R_i = D_i / C_i (1 \leq i \leq m) \tag{8}$$

Assuming that the i-th coding unit 1-1 of FIG. 1 has a minimum code distance $d_{min}^2(i)$ and a coding rate $R_i$ ($1 \leq i \leq m$), then, an average coding rate R* is represented as:

$$R^* = V/W = (1/W) \cdot \Sigma_{i=1}^{m} \{w_i R_i\} \tag{9}$$

With regard to the coding units 1-1, it should be noted that there are no rules or restrictions on a number of coding units that do not attend to error corrections as well as on positions of such coding units (i.e., positions of data sub-frames), and that unlimited latitude is given in setting such a number and positions.

These coding units without error correction inevitably have a coding rate $R_i = 1$, resulting in $d_{min}^2 = d^2$. Such coding units do nothing but passing the input information to the output thereof.

According to the present invention, the modulation level can also be treated as a parameter that provides different minimum code distances. Where qualities such as bit error rates required for different code sub-frames $FC_i$ and $FC_j$ are denoted $q_i$ and $q_j$ ($q_i \leq q_j$), respectively, unequal error protection is tantamount to providing different minimum code distances by achieving $d_{min}^2(i) \geq d_{min}^2(j)$. When the transmission power is constant, the present invention thus can utilize the fact that the minimum code distances differ depending on the modulation levels.

When a M-ary modulation scheme (M-ary PSK, MPSK) is employed, a change from QPSK based on a modulation level M of 2 to 8PSK based on an modulation level M of 3 entails the transmission rate that is 3/2 times as much. Compared with a minimum distance between signals $d^2$ of QPSK, also, a minimum distance of 8PSK becomes $0.736d^2$.

Figure 3:
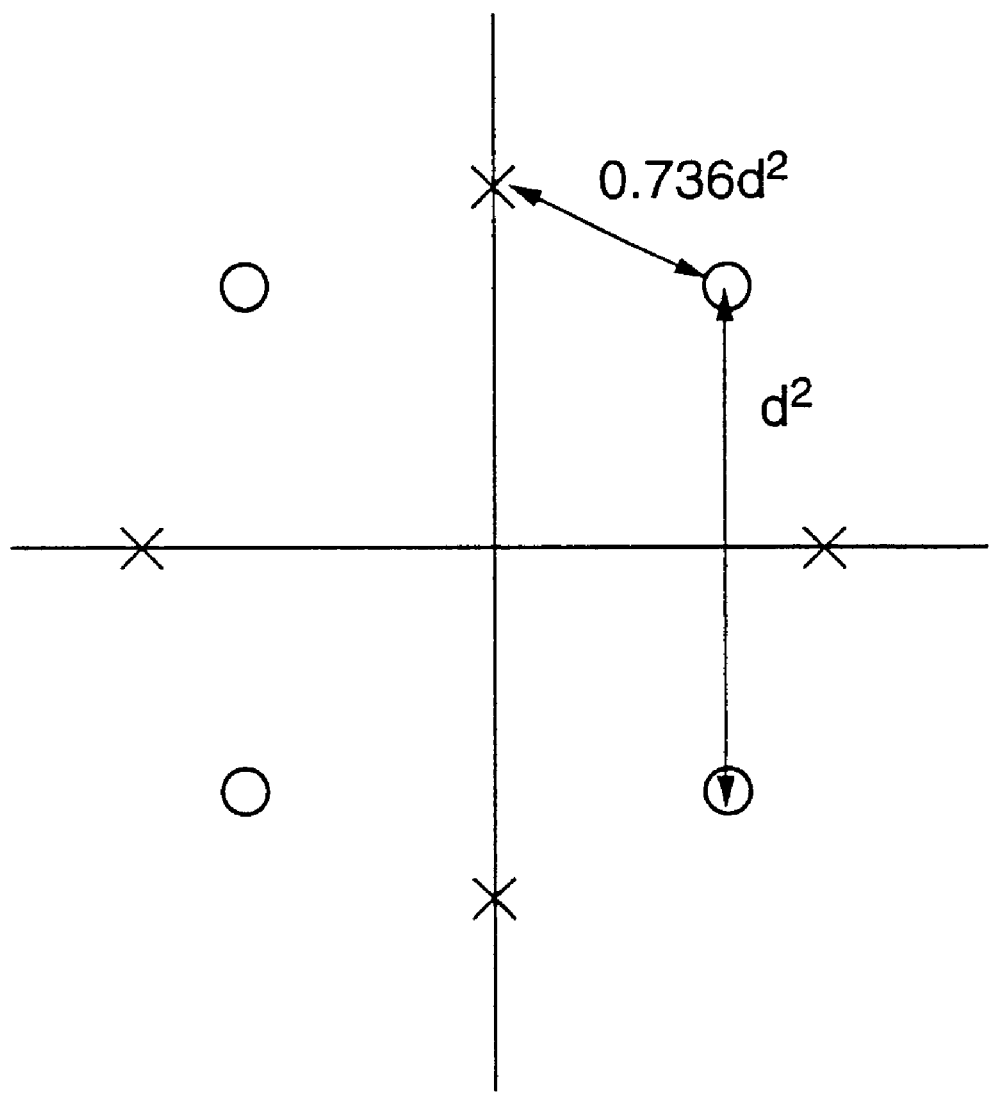
FIG. 3 is an illustrative drawing showing a change in a minimum distance between signals in a M-ary modulation scheme.

FIG. 3 is an illustrative drawing showing the minimum distance between signals in the 8-PSK modulation scheme.

In the figure, signal points of QPSK are shown by open circles, and have a distance between signals $d^2$. Signal points of 8PSK are shown by open circles and symbols "x", and have a distance between signals $0.736d^2$.

In a similar coding rate, use of 8PSK results in a smaller minimum distance, and, thus, entails a lower channel quality than when QPSK is used.

Namely, a coding rate $R_i$ is determined as:

$$R_i = R_c \cdot R_m \tag{10}$$

where $R_c$ is a coding rate for error correction, and $R_m$ is a coding rate derived from the modulation level. As long as a minimum code distance $d_{min}^2(i)$ satisfies a channel quality $q_i$, there are no rules or restrictions on a combination of the error correction and the modulation scheme. That is, the coding rate $R_m$ of the modulation level may be kept constant while the coding rate $R_c$ of the error correction is varied, or the coding rate $R_m$ of the modulation level may be varied while the coding rate $R_c$ of the error correction is kept constant. Or even both coding rates may be varied.

Further, as long as the minimum code distance $d_{min}^2(i)$ exceeds a predetermined threshold so as to provide a required channel quality, there are no rules or restrictions on types of employed modulation schemes when different modulation schemes are used for different sub-carriers in one multi-carrier symbol within the same sub-frame.

In the manner as described above, the present invention treats one multi-carrier symbol of n sub-carriers as a n-dimensional signal space, and can be regarded as a coding modulation scheme which attends to coding in this signal space.

In coding of data in the n-dimensional signal space, the present invention may employ codes having peak envelope powers lower than a predetermined threshold, thereby concurrently achieving unequal error protection and a peak power reduction.

Codes having lower peak power is such a partial set of the entire code space $C_n$ as a total power of sub-carrier signal points does not exceed a predetermined threshold. This partial set is denoted as $C_r$. When the partial set $C_r$ is substituted for the entire code space $C_n$ as codes $C_{ps}$ to be used in the coding units 1-1 of FIG. 1, a reduction in peak power is achieved.

As a peak power reduction code, a complementary code system is well known, and its applicability to the multi-carrier modulation has been an important research subject. Codes of the complementary code system have keen auto-correlation, and are applicable to peak power reduction for M-ary PSK modulation.

Further, these codes achieve a coding rate $R=(\log_2 N+1)/N$, a minimum code distance $d_{min}^2=(N/2)\cdot d^2$, and a peak-power reduction $P_{gain}=(2/N)\cdot P$ with respect to N sub-carrier codes.

It should be noted that P is a peak power of N sub-carriers. When 4 sub-carriers are provided (i.e., N=4), a coding rate R of 3/4, a minimum code distance $d_{min}^2$ of $2d^2$, and a peak-power reduction $P_{gain}$ of $(1/2)\cdot P$ are obtained. When 8 sub-carriers are provided (i.e., N=8), a coding rate R of 1/2, a minimum code distance $d_{min}^2$ of $4d^2$, and a peak-power reduction $P_{gain}$ of $(1/4)\cdot P$ are obtained.

Figure 4:
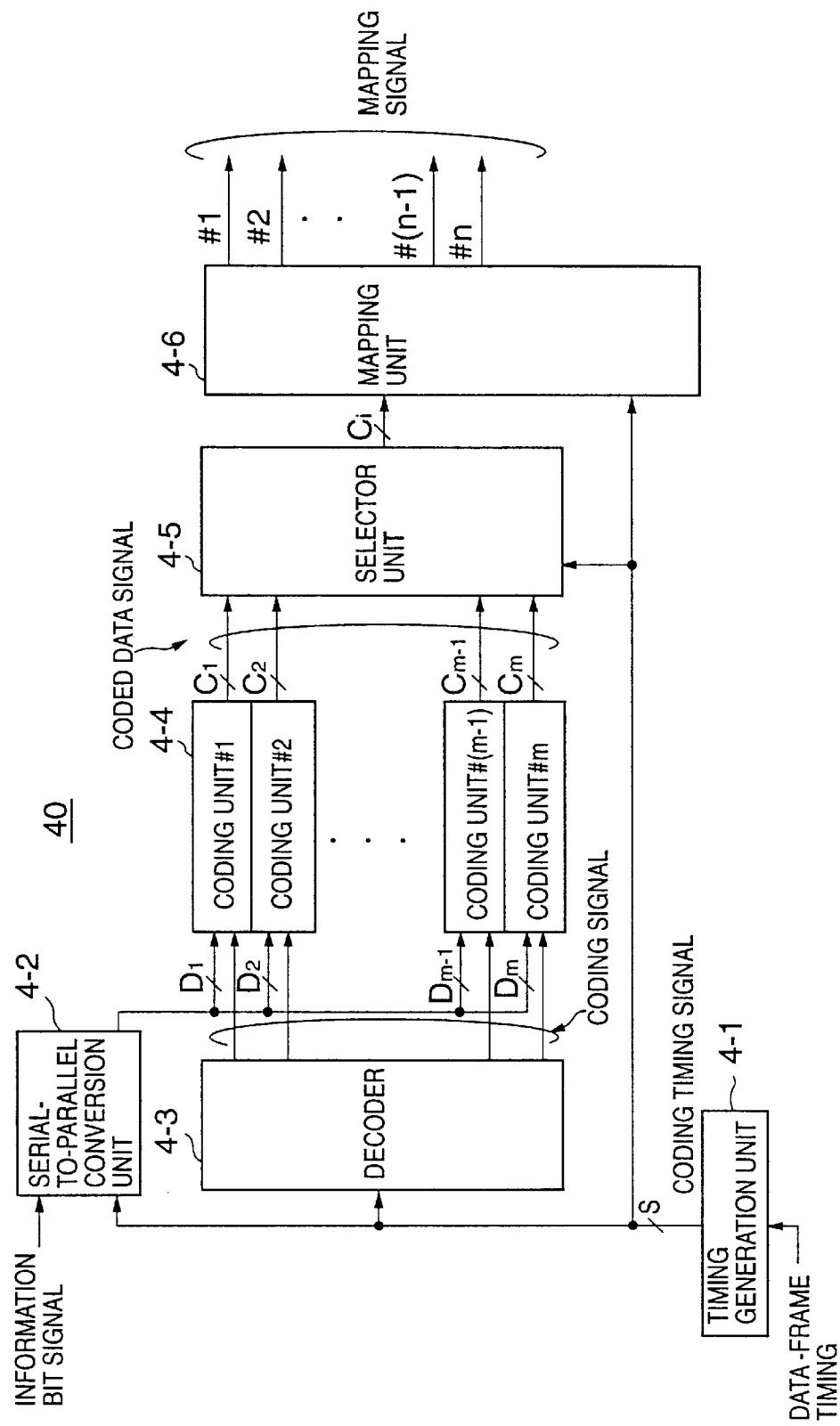
FIG. 4 is a block diagram of a first embodiment of a coding device according to the present invention.

FIG. 4 is a block diagram of a first embodiment of a coding device according to the present invention.

A coding device 40 of FIG. 4 is provided with a function to attend to coding capable of providing m different error protections, and includes a timing generation unit 4-1, a serial-to-parallel conversion unit 4-2, a decoder 4-3, m coding units 4-4, a selector unit 4-5, and a mapping unit 4-6.

The coding device 40 receives an information bit signal and a data-frame timing signal, and encodes the information bit signal to output mapping signals with respect to n sub-carriers.

The timing generation unit 4-1 generates a code timing signal from the data-frame timing signal, and supplies the code timing signal to the serial-to-parallel conversion unit 4-2, the decoder 4-3, the selector unit 4-5, and the mapping unit 4-6.

The timing generation unit 4-1 operates on a data-frame-wise basis, and outputs m different code timing signals successively according to the data-frame format of one data frame. Here, the number (S) of bits of the code timing signal is equal to the number of bits necessary to represent m different signals.

The serial-to-parallel conversion unit 4-2 attends to a serial-to-parallel conversion while changing the number of output bits to satisfy the coding rate $R_i$ shown in the equation (8) previously described, and such a conversion is made based on the code timing signal. The information bit signal output from the serial-to-parallel conversion unit 4-2 is supplied to the coding units 4-4.

The decoder 4-3 generates m coding active/non-active signals based on the code timing signal, and supplies the control signals to the respective coding units 4-4. Here, each of the control signals becomes active only when a corresponding coding unit 4-4 is to be activated to perform coding operation.

An i-th unit of the coding units 4-4 encodes a $D_i$-bit input signal on a multi-carrier-symbol-wise basis such as to satisfy the coding rate of the equation (8), and outputs a $C_i$-bit coded data signal as data for one multi-carrier symbol.

Each of the coding units 4-4 operates only when it is activated by the corresponding coding active/non-active signal. The selector unit 4-5 successively selects, based on the code timing signal, one of the m coded data signals supplied from the coding units 4-4, and supplies the selected one of the m coded data signals to the mapping unit 4-6. The number $C_i$ of bits output from the selector unit 4-5 is the same as the number of bits of a coded data signal supplied from the selected one of the coding units 4-4.

The mapping unit 4-6 maps the $C_i$-bit coded data signal supplied from the selector unit 4-5 onto n sub-carrier modulation signals according to the code timing signal. The n sub-carrier mapping signals thus generated are used for modulating n respective sub-carriers, thereby generating sub-carrier modulated signals.

Figure 5:
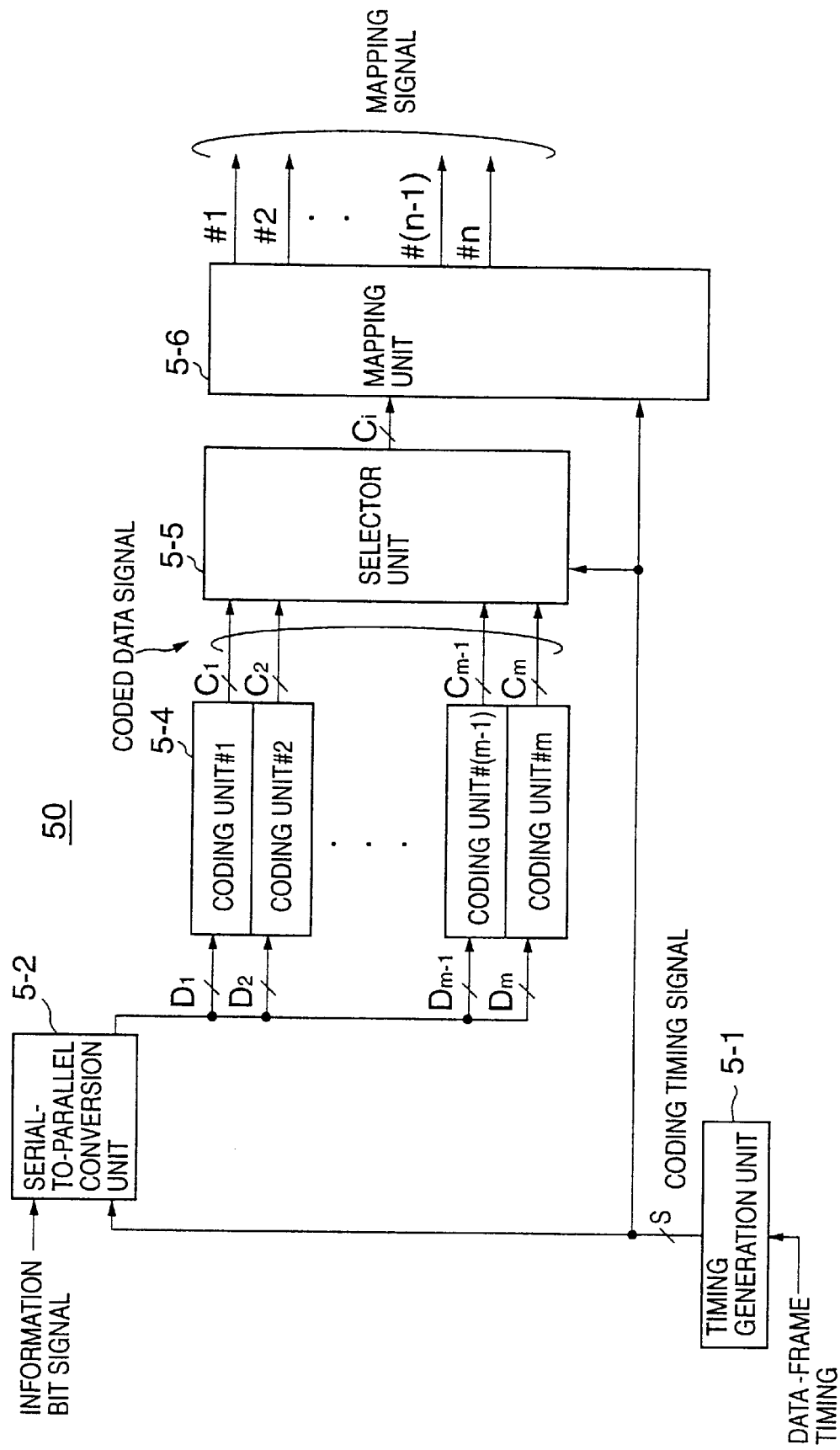
FIG. 5 is a block diagram of a second embodiment of a coding device according to the present invention.

FIG. 5 is a block diagram of a second embodiment of a coding device according to the present invention.

A coding device 50 of FIG. 5 includes a timing generation unit 5-1, a serial-to-parallel conversion unit 5-2, m coding units 5-4, a selector unit 5-5, and a mapping unit 5-6. The coding device 50 of the second embodiment lacks the decoder 4-3 of the coding device 40 of the first embodiment.

In the same manner as the coding device 40, the coding device 50 receives an information bit signal and a data-frame timing signal, and encodes the information bit signal to output mapping signals with respect to n sub-carriers.

The timing generation unit 5-1 generates a code timing signal from the data-frame timing signal, and supplies the code timing signal to the serial-to-parallel conversion unit 5-2, the selector unit 5-5, and the mapping unit 5-6. Operation of the timing generation unit 5-1 is substantially the same as that of the coding device 40, and a duplicate description thereof will be omitted.

In the same manner as the serial-to-parallel conversion unit 4-2 of the coding device 40, the serial-to-parallel conversion unit 5-2 attends to a serial-to-parallel conversion while changing the number of output bits to satisfy the required coding rate $R_i$, and such a conversion is made based on the code timing signal. The information bit signal output from the serial-to-parallel conversion unit 5-2 is supplied to the coding units 5-4.

In the same manner as in the coding device 40, an i-th unit of the coding units 5-4 encodes a $D_i$-bit input signal on a multi-carrier-symbol-wise basis such as to satisfy the coding rate of the equation (8), and outputs a $C_i$-bit coded data signal as data for one multi-carrier symbol.

In the coding device 40 of the first embodiment, only one of the coding units 4-4 is activated at a time to attend to coding operation by the coding active/non-active signal supplied from the decoder 4-3. On the other hand, all the coding units 5-4 of the coding device 50 according to the second embodiment are active all the time, so that all the coding units 5-4 attend to coding operation at all times.

The selector unit 5-5 and the mapping unit 5-6 operate in the same manner as the selector unit 4-5 and the mapping unit 4-6, respectively, of the coding device 40 of the first embodiment. The selector unit 5-5 successively selects, based on the code timing signal, one of the m coded data signals supplied from the coding units 5-4, and supplies the selected one of the m coded data signals to the mapping unit 5-6. The mapping unit 5-6 maps the $C_i$-bit coded data signal providing data for one multi-carrier symbol onto n sub-carrier modulation signals according to the code timing signal.

The coding device 50 according to the second embodiment does not need a unit equivalent to the decoder 4-3 used in the coding device 40, so that the coding device 50 may be implemented by using a circuit having a smaller size and a simpler configuration. In the coding device 40 of the first embodiment, on the other hand, one of the coding units 4-4 is activated by the coding active/non-active signal from the decoder 4-3 while the other unselected coding units are not in operation. Because of this, the coding device 40 has a reduced power consumption in the coding units 4-4 compared with the coding device 50 of the second embodiment.

In the following, a decoding device according to the present invention will be described.

The decoding device of the present invention decodes a sequence of $C_i$-bit n-sub-carrier signals to generate $D_i$-bit information signals corresponding to one symbol frame by using the maximum likelihood method.

The sequence of received signals of the multi-carrier transmission is denoted as a vector r.

$$r = \{r_1, r_2, \cdots, r_m\} \quad (11)$$

Then, a likelihood function $\beta(c(i))$ for a code $c(i)$ is represented as:

$$\beta(c(i)) = \Sigma_{m=1}^{n} \{S_m(c(i)) - r_m\} \quad (12)$$

Then, the code $c(i\hat{})$ is calculated such that the likelihood function $\beta(c(i))$ becomes a minimum value, and this information bit sequence $i\hat{}$ is obtained as the decoded data.

$$\text{Choose } i\hat{} \text{ if } \beta(c(i\hat{})) = \min \{\beta(c(i))\} \quad (13)$$

Figure 6:
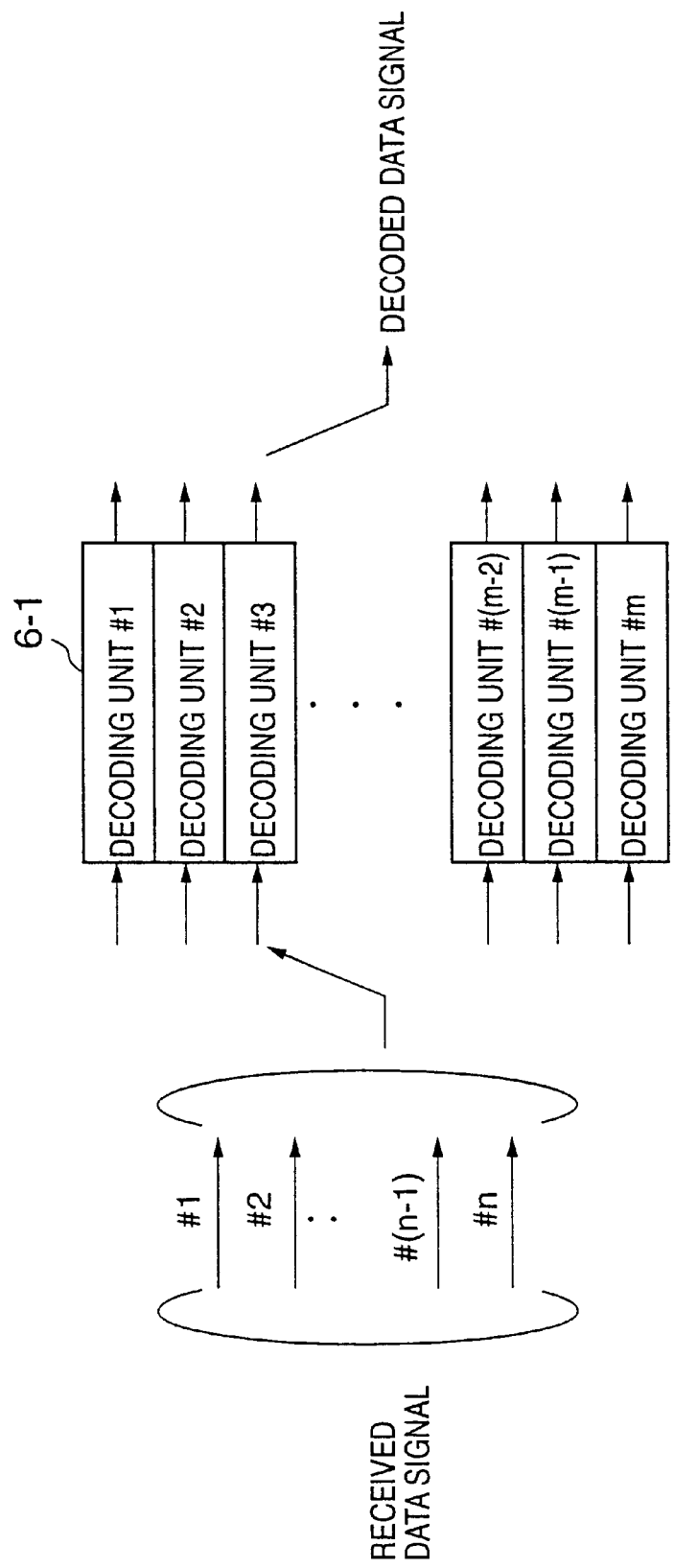
FIG. 6 is an illustrative drawing showing a basic configuration of a decoder according to the present invention.

FIG. 6 is an illustrative drawing showing a basic configuration of a decoding device according to the present invention.

The decoding device of FIG. 6 receives a code frame as shown in FIG. 2B obtained after multi-carrier modulation. As shown in FIG. 6, m decoding units 6-1 decodes the n received data signals (#1 through #n).

The received data signals are switched with respect to each code sub-frame to be successively input to a corresponding one of the decoding units 6-1. Here, th received data signals are complex signals (I ch/Q ch).

Figure 7:
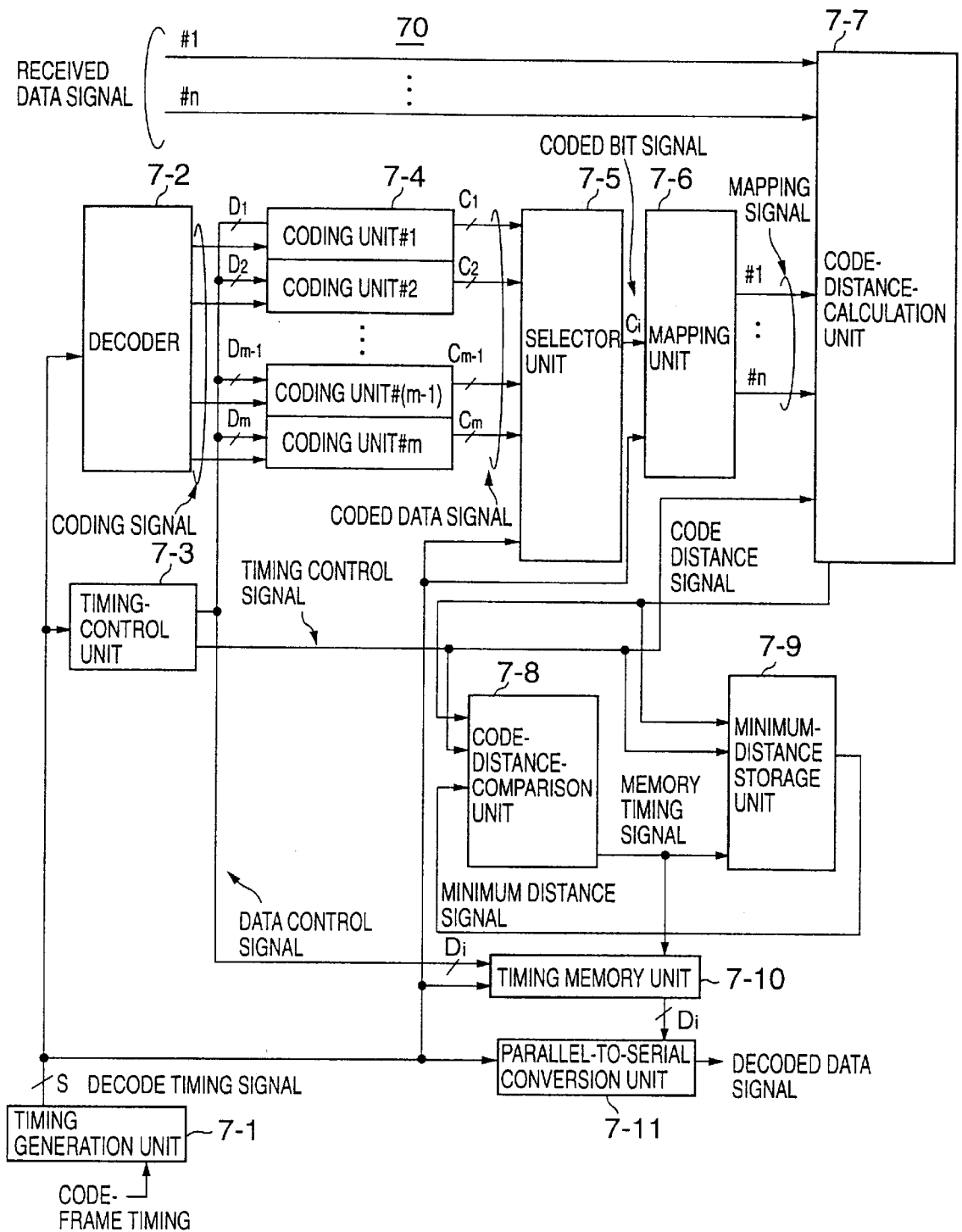
FIG. 7 is a block diagram of a first embodiment of a decoding device according to the present invention.

FIG. 7 is a block diagram of a first embodiment of a decoding device according to the present invention.

A decoding device 70 of FIG. 7 is provided with a function to decode data signals having m different error protections, and includes a timing generation unit 7-1, a decoder 7-2, a timing-control unit 7-3, m coding units 7-4, a selector unit 7-5, a mapping unit 7-6, a code-distance-calculation unit 7-7, a code-distance-comparison unit 7-8, a minimum-distance storage unit 7-9, a timing memory unit 7-10, and a parallel-to-serial conversion unit 7-11.

The decoding device 70 receives a code-frame timing signal and data signals (#1 through #n) with respect to n sub-carriers, and decodes the received data to output a decoded data signal.

The timing generation unit 7-1 generates a decode timing signal from the code-frame timing signal, and supplies the decode timing signal to the decoder 7-2, the timing-control unit 7-3, the selector unit 7-5, the mapping unit 7-6, the timing memory unit 7-10, and the parallel-to-serial conversion unit 7-11.

The timing generation unit 7-1 operates on a code-frame-wise basis, and outputs m different decode timing signals successively according to the code-frame format of one code frame. Here, the number (S) of bits of the decode timing signal is equal to the number of bits necessary to represent m different signals.

The decoder 7-2 generates m coding active/non-active signals based on the decode timing signal, and supplies the control signals to the respective coding units 7-4. Here, each of the control signals becomes active only when a corresponding coding unit 7-4 is to be activated to perform coding operation.

The timing-control unit 7-3 outputs a data control signal having the number of bits thereof equal to $D_i$ that is the number of bits input to the coding units of the coding device previously described where the data control signal is changed successively (i=1 through m) according to the decode timing signal. The data control signal is supplied to the m coding units 7-4 and the timing memory unit 7-10.

Further, the timing-control unit 7-3 operates on a multi-carrier-symbol-wise basis, and outputs the data control signal such that all the values possibly represented by $D_i$ (i=1 through m) bits are generated in one multi-carrier-symbol duration.

Moreover, the timing-control unit 7-3 generates a timing control signal that becomes active when the data control signal exhibits a change, and supplies the timing control signal to the code-distance-calculation unit 7-7, the code-distance-comparison unit 7-8, and the minimum-distance storage unit 7-9. The purpose of the timing control signal is to notify these units of timings at which the data control signal changes.

The coding units 7-4 encode the data control signal supplied form the timing-control unit 7-3 so as to achieve the coding rate of the equation (8) in the same manner as the coding units of the coding device previously described. Here, $C_1$ through $C_m$ shown in FIG. 7 indicate the numbers of bits included in respective coded data signals output from the coding units 7-4.

The selector unit 7-5 successively selects, based on the decode timing signal, one of the m coded data signals supplied from the coding units 7-4, and supplies the selected one of the m coded data signals as a coded bit signal. The number $C_i$ of bits output from the selector unit 7-5 is the number of bits included the selected one of the coded data signals.

The mapping unit 7-6 maps the $C_i$-bit coded bit signal supplied from the selector unit 7-5 as data for one multi-carrier symbol onto n sub-carrier modulation signals according to the decode timing signal. The n sub-carrier mapping signals thus generated are used for modulating n respective sub-carriers, thereby generating sub-carrier modulated signals in the same manner as in the coding device previously described.

The code-distance-calculation unit 7-7 calculates a code distance between the received data signals and the mapping signals in synchronization with the timing control signal. A code-distance signal indicative of the calculated code distance is supplied to the code-distance-comparison unit 7-8 and the minimum-distance storage unit 7-9.

The code-distance-comparison unit 7-8 compares the code-distance signal supplied from the code-distance-calculation unit 7-7 with a minimum-code-distance signal stored in the minimum-distance storage unit 7-9 where the minimum-code-distance signal is a product obtained from the previous successive comparisons. This comparison is made in synchronization with the timing control signal.

The code-distance-comparison unit 7-8 outputs a memory timing signal, which becomes active when the current code-distance signal is smaller than the minimum-code-distance signal.

The minimum-distance storage unit 7-9 stores therein the code-distance signal supplied from the code-distance-calculation unit 7-7 as a new minimum-code-distance signal when the memory timing signal becomes active.

The minimum-code-distance data stored in the minimum-distance storage unit 7-9 is output as the minimum-code-distance signal to the code-distance-comparison unit 7-8 in synchronization with the timing control signal. The minimum-code-distance data is reset for each multi-carrier-symbol duration, so that the minimum-code-distance data is a representation of a minimum-code distance for one multi-carrier-symbol duration.

The timing memory unit 7-10 receives the data control signal from the timing-control unit 7-3, and stores therein the data control signal when the memory timing signal becomes active.

The data stored in the timing memory unit 7-10 is supplied to the parallel-to-serial conversion unit 7-11 at an interval of one multi-carrier symbol duration in synchronization with the decode timing signal. After the data is supplied, the data is reset. As a result of this operation, the most likely decoded data having the smallest code distance from the received data signals is output as a decoded data signal.

Figure 8:
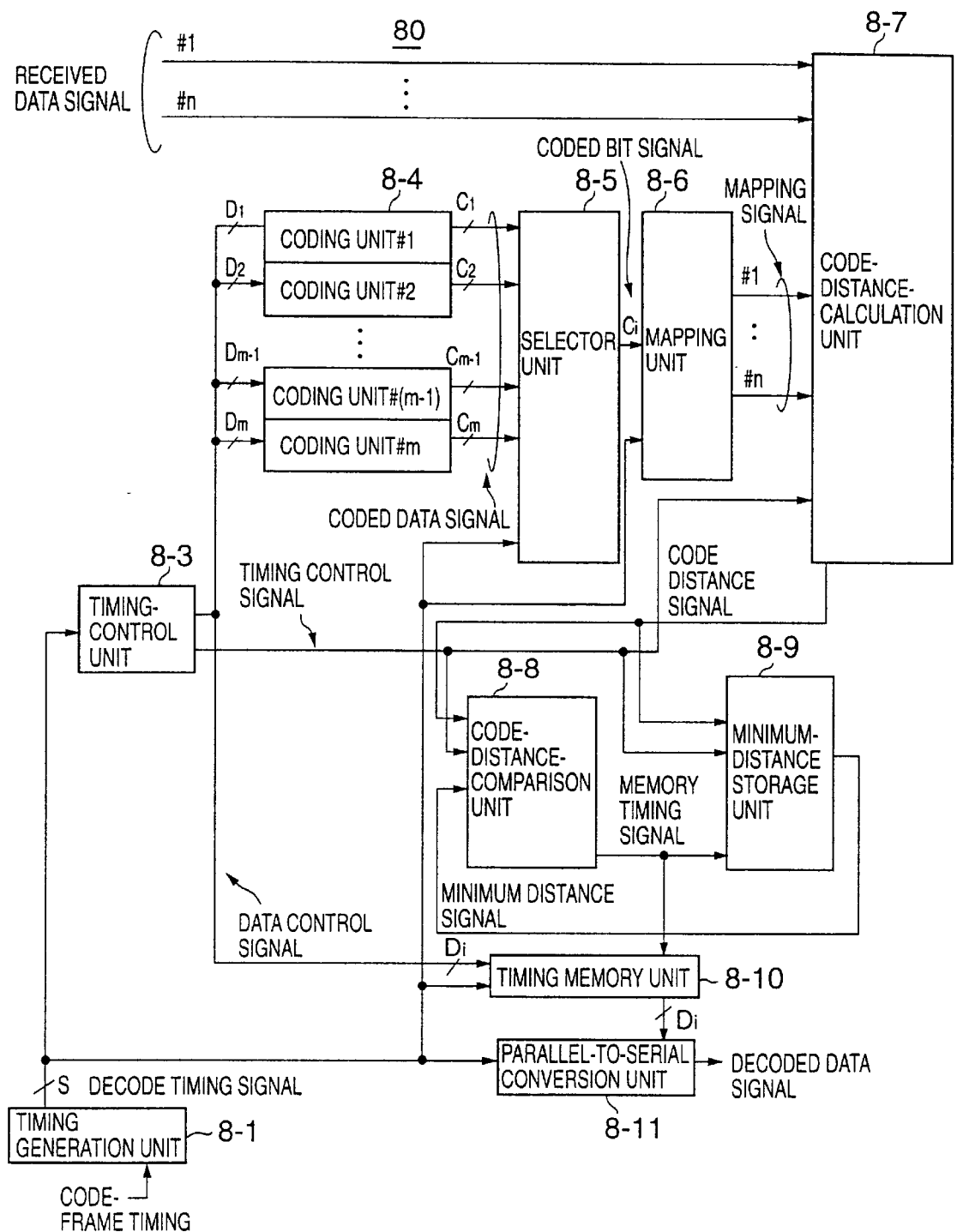
FIG. 8 is a block diagram of a second embodiment of a decoding device according to the present invention.

FIG. 8 is a block diagram of a second embodiment of a decoding device according to the present invention.

A decoding device 80 of FIG. 8 is provided with a function to decode data signals having m different error protections, and includes a timing generation unit 8-1, a timing-control unit 8-3, m coding units 8-4, a selector unit 8-5, a mapping unit 8-6, a code-distance-calculation unit 8-7, a code-distance-comparison unit 8-8, a minimum-distance storage unit 8-9, a timing memory unit 8-10, and a parallel-to-serial conversion unit 8-11.

In a similar manner to the decoding device 70 of the first embodiment, the decoding device 80 of the second embodiment receives a code-frame timing signal and data signals (#1 through #n) with respect to n sub-carriers, and decodes the received data to output a decoded data signal.

The decoding device 80 differs from the decoding device 70 of FIG. 7 only in that the decoder 7-2 of the decoding device 70 is not provided in the decoding device 80. In the decoding device 70 of the first embodiment, only one of the coding units 7-4 that is activated by the coding active/non-active signal from the decoder 7-2 attends to coding operation. On the other hand, all the coding units 8-4 of the decoding device 80 according to the second embodiment are in an active state all the time, so that all the coding units 8-4 attend to coding operation at all times.

The decoding device 80 according to the second embodiment does not need a unit equivalent to the decoder 7-2 used in the decoding device 70 of the first embodiment, so that the decoding device 80 may be implemented by using a circuit having a smaller size and a simpler configuration. In the decoding device 70 of the first embodiment, on the other hand, one of the coding units 7-4 is activated by the coding active/non-active signal from the decoder 7-2 while the other unselected coding units are not in operation. Because of this, the decoding device 70 has a reduced power consumption in the coding units 7-4 compared with the decoding device 80 of the second embodiment.

The configuration of the decoding device 80 of the second embodiment is almost the same as that of the decoding device 70 of the first embodiment, and a duplicate description thereof will be omitted.

Figure 9:
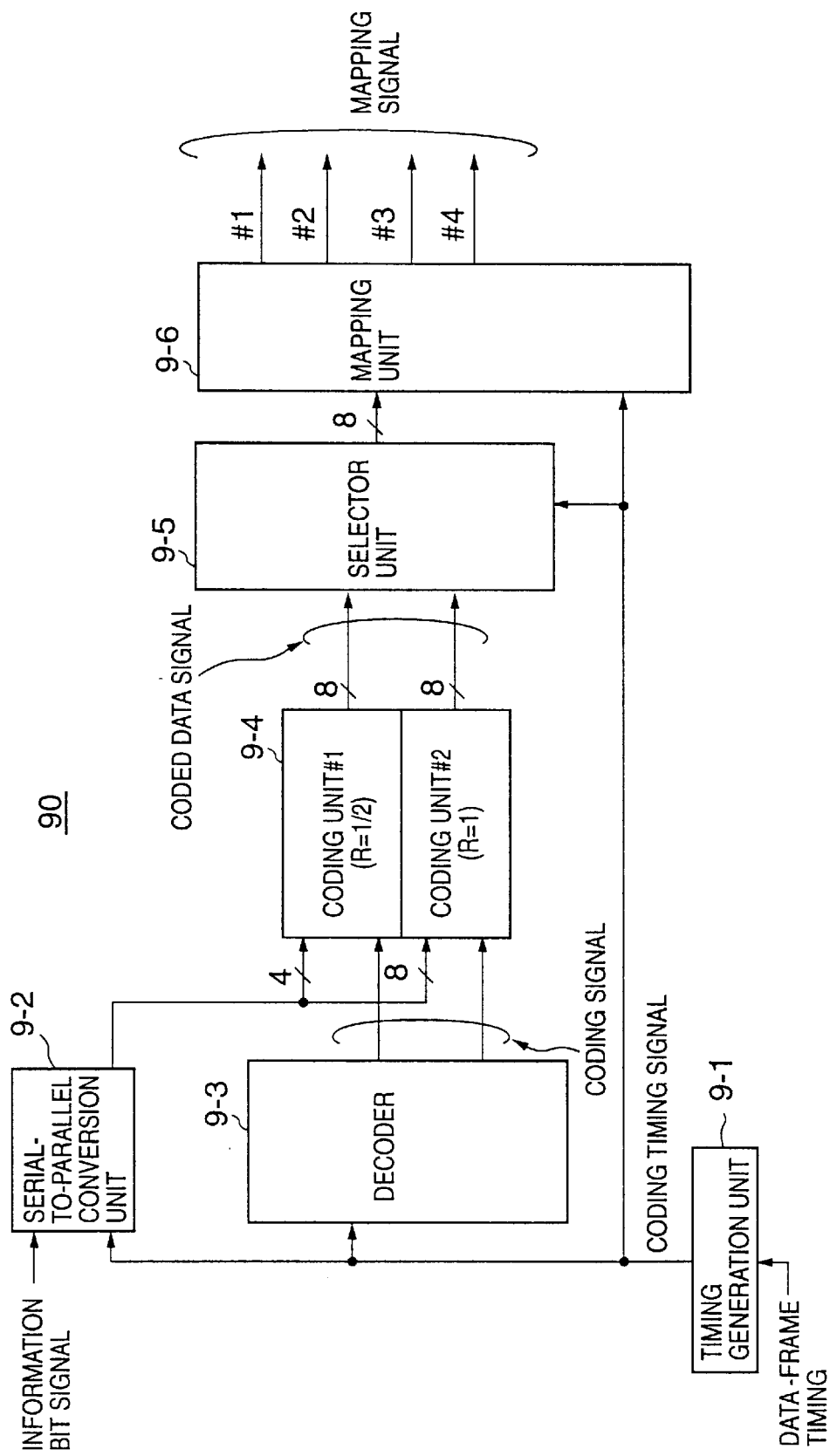
FIG. 9 is a block diagram showing a simplified version of the first embodiment of a coding device according to the present invention.

FIG. 9 is a block diagram showing a simplified version of the first embodiment of the coding device according to the present invention.

FIG. 9 is shown here for the purpose of explaining detailed operation of the first embodiment of the coding device. In the figure, a simplified version of the coding device is shown, which performs 2 different error protections in a multi-carrier-transmission system using 4 sub-carriers. A coding device 90 of FIG. 9 includes a timing generation unit 9-1, a serial-to-parallel conversion unit 9-2, a decoder 9-3, two coding units 9-4, a selector unit 9-5, and a mapping unit 9-6.

The coding device 90 receives an information bit signal and a data-frame timing signal, and outputs four mapping signals (#1 through #4) with respect to four sub-carriers. This configuration modulates each sub-carrier according to QPSK, and, thus, serves as a coder for multi-carrier modulation of four sub-carriers.

The coding units 9-4 of this configuration encode an input signal by a unit of a multi-carrier symbol such as to achieve two different coding rates $R_1=1/2$ and $R_2=1$ (no error correction). The coding units 9-4 outputs 8-bit coded data signals as data for one multi-carrier symbol.

FIG. 10 is a table showing relations between inputs and outputs of the first one of the coding units 9-4. Please note that the second one of the coding units 9-4 simply passes its input data to an output thereof without any variation. Codes generated by the first one of the coding units 9-4 have a code distance of $4d^2$ (power), and codes generated by the second one of the coding units 9-4 have a code distance of $d^2$.

In this manner, two signals having different code distances, i.e., two signals having different error protections, are generated. Channel quality of these signals is 6 dB deferent for an S/N ratio.

Each element of the coding device 90 shown in FIG. 9 operates in similar manner to a corresponding element of FIG. 4. It should be noted that the number of bits input to or output from the coding units 9-4 is shown in the figure, and so is the number of bits output from the selector unit 9-5.

Figure 11:
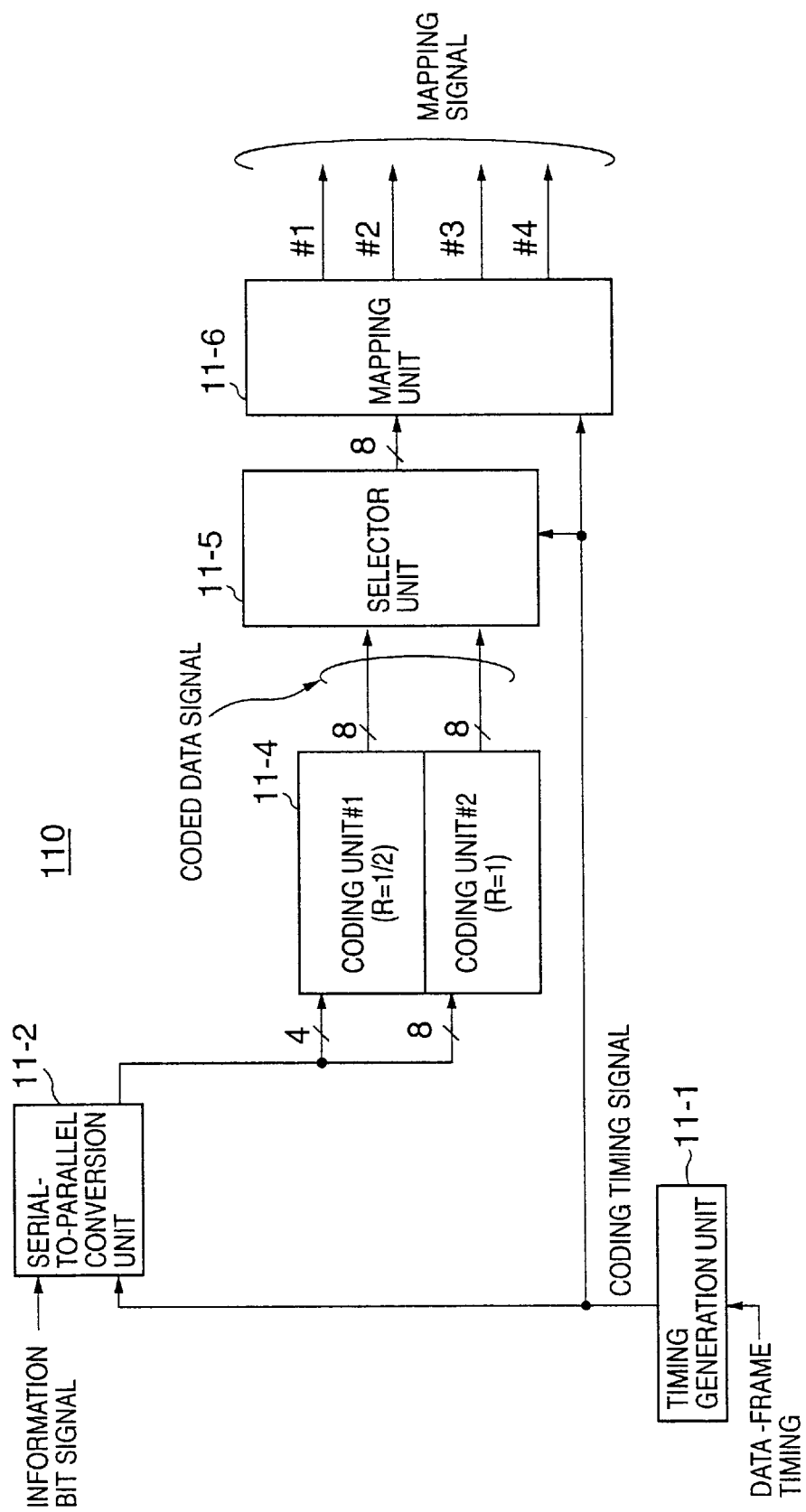
FIG. 11 is a block diagram showing a simplified version of the second embodiment of a coding device according to the present invention.

FIG. 11 is a block diagram showing a simplified version of the second embodiment of a coding device according to the present invention.

FIG. 11 shows a configuration which achieves two different error protections in a multi-carrier transmission system using four sub-carriers. A coding device 110 includes a timing generation unit 11-1, a serial-to-parallel conversion unit 11-2, two coding units 11-4, a selector unit 11-5, and a mapping unit 11-6.

The coding device 110 of FIG. 11 differs from the coding device 90 of FIG. 9 only in that the decoder 9-3 of the coding device 90 is not provided in the coding device 110. In the coding device 110, the two coding units 11-4 operate all the time. Except for this, the coding device 110 operates in the same manner as the coding device 90 of FIG. 9.

Figure 12:
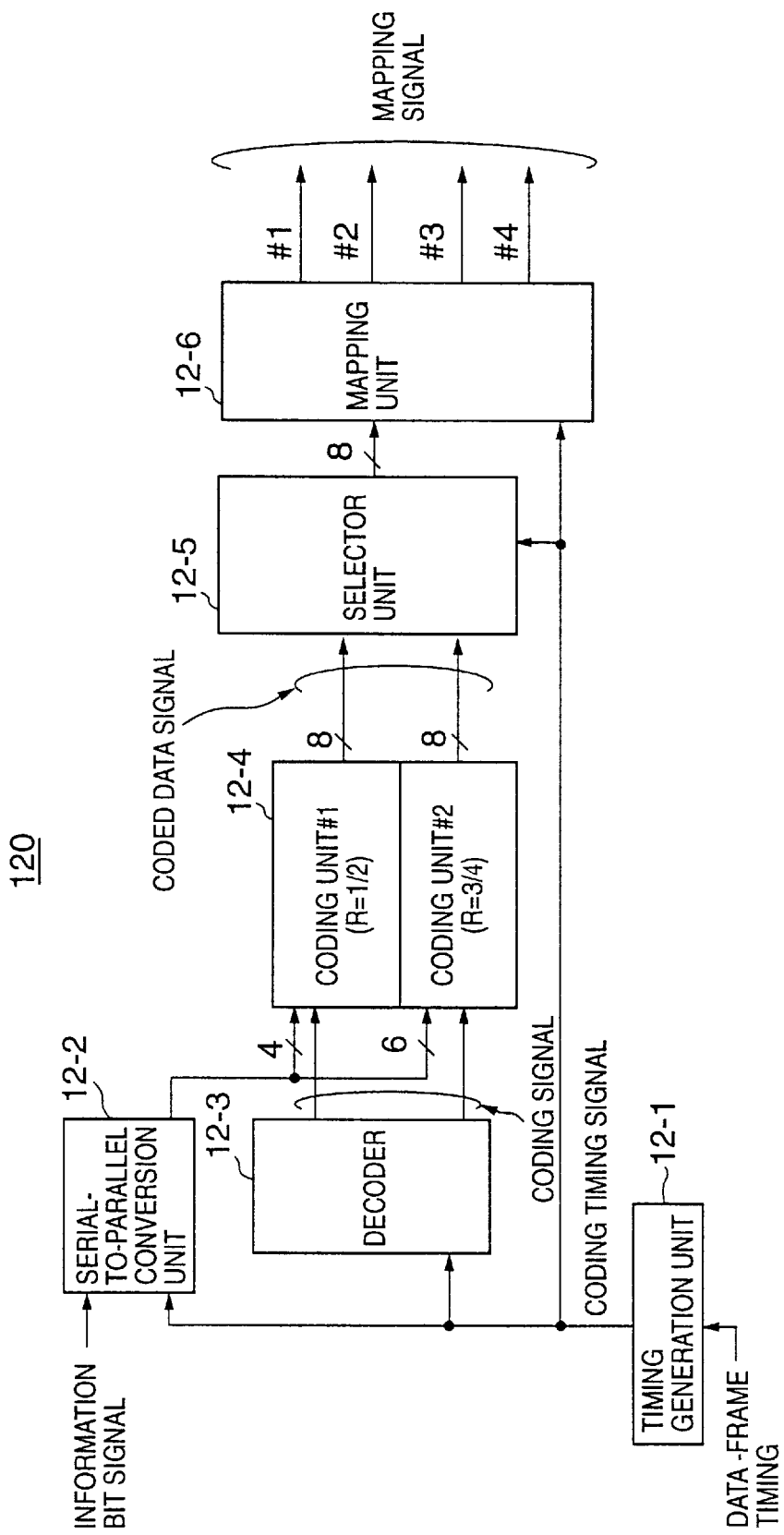
FIG. 12 is a block diagram showing another simplified version of the first embodiment of a coding device according to the present invention.

FIG. 12 is a block diagram showing another simplified version of the first embodiment of a coding device according to the present invention.

FIG. 12 shows a configuration which achieves two different error protections in a multi-carrier transmission system using four sub-carriers. A coding device 120 includes a timing generation unit 12-1, a serial-to-parallel conversion unit 12-2, a decoder 12-3, two coding units 12-4, a selector unit 12-5, and a mapping unit 12-6.

The coding device 120 receives an information bit signal and a data-frame timing signal, and outputs four mapping signals (#1 through #4) with respect to four sub-carriers. This configuration modulates each sub-carrier according to QPSK, and, thus, serves as a coder for multi-carrier modulation of four sub-carriers.

The coding units 12-4 of this configuration attend to coding of data by use of complementary codes. The first one of the coding units 12-4 has a coding rate $R_1=1/2$, and the second one has a coding rate $R_2=3/4$.

Codes generated by the first one of the coding units 12-4 have a code distance of $4d^2$, and codes generated by the second one of the coding units 12-4 have a code distance of $2d^2$. Channel quality of these codes is 3 dB different for an S/N ratio.

In this configuration, the signals output from the two coding units 12-4 have a reduced peak power. Namely, this configuration not only achieves two different error protections, but also generates signals with reduced peak power.

Here, a peak-power reduction is defined by the highest peak power. In this configuration, therefore, a peak-power reduction $P_{gain}$ becomes 1/2P.

Each element other than the coding units 12-4 operates in the same manner as does a corresponding element of the coding device 90 shown in FIG. 9. It should be noted, however, that an input to the first coding unit 12-4 is 4 bits, and an input to the second coding unit 12-4 is 6 bits. Further, each of the coding units 12-4 outputs a 8-bit coded data signal.

Figure 13:
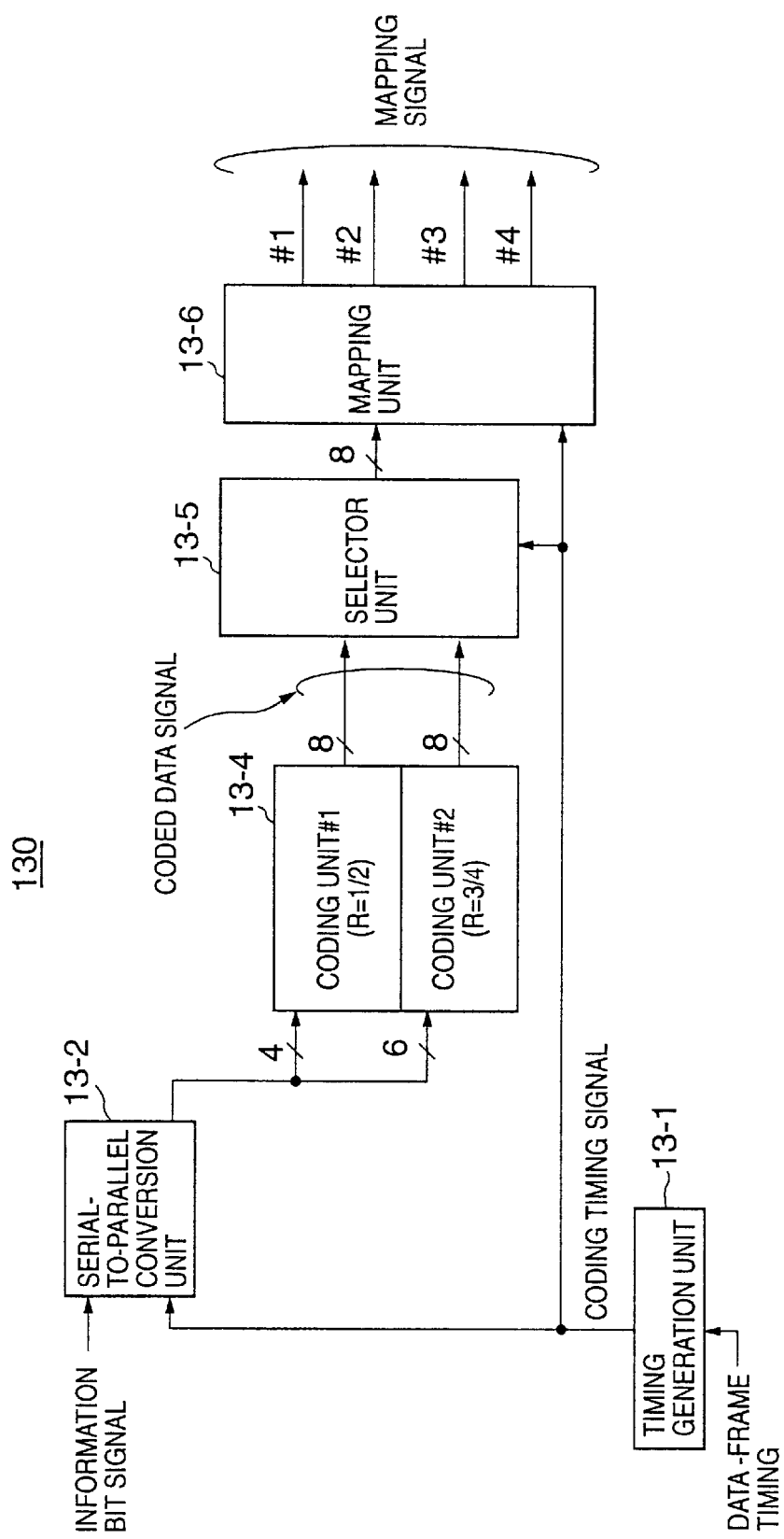
FIG. 13 is a block diagram showing another simplified version of the second embodiment of a coding device according to the present invention.

FIG. 13 is a block diagram showing another simplified version of the second embodiment of a coding device according to the present invention.

FIG. 13 shows a configuration which achieves two different error protections in a multi-carrier transmission system using four sub-carriers. A coding device 130 includes a timing generation unit 13-1, a serial-to-parallel conversion unit 13-2, two coding units 13-4, a selector unit 13-5, and a mapping unit 13-6.

The coding device 130 receives an information bit signal and a data-frame timing signal, and outputs four mapping signals with respect to four sub-carriers. This configuration modulates each sub-carrier according to QPSK, and, thus, serves as a coder for multi-carrier modulation of four sub-carriers.

The coding device 130 is not provided with the decoder 12-3 of the coding device 120, thereby achieving a simpler circuit configuration. Each element of the coding device 130 operates in the same manner as a corresponding element of the coding device 120 so as to provide signals having two different protections and reduced peak power. It should be noted that all the coding units 13-4 are in an active operation state all the time.

Figure 14:
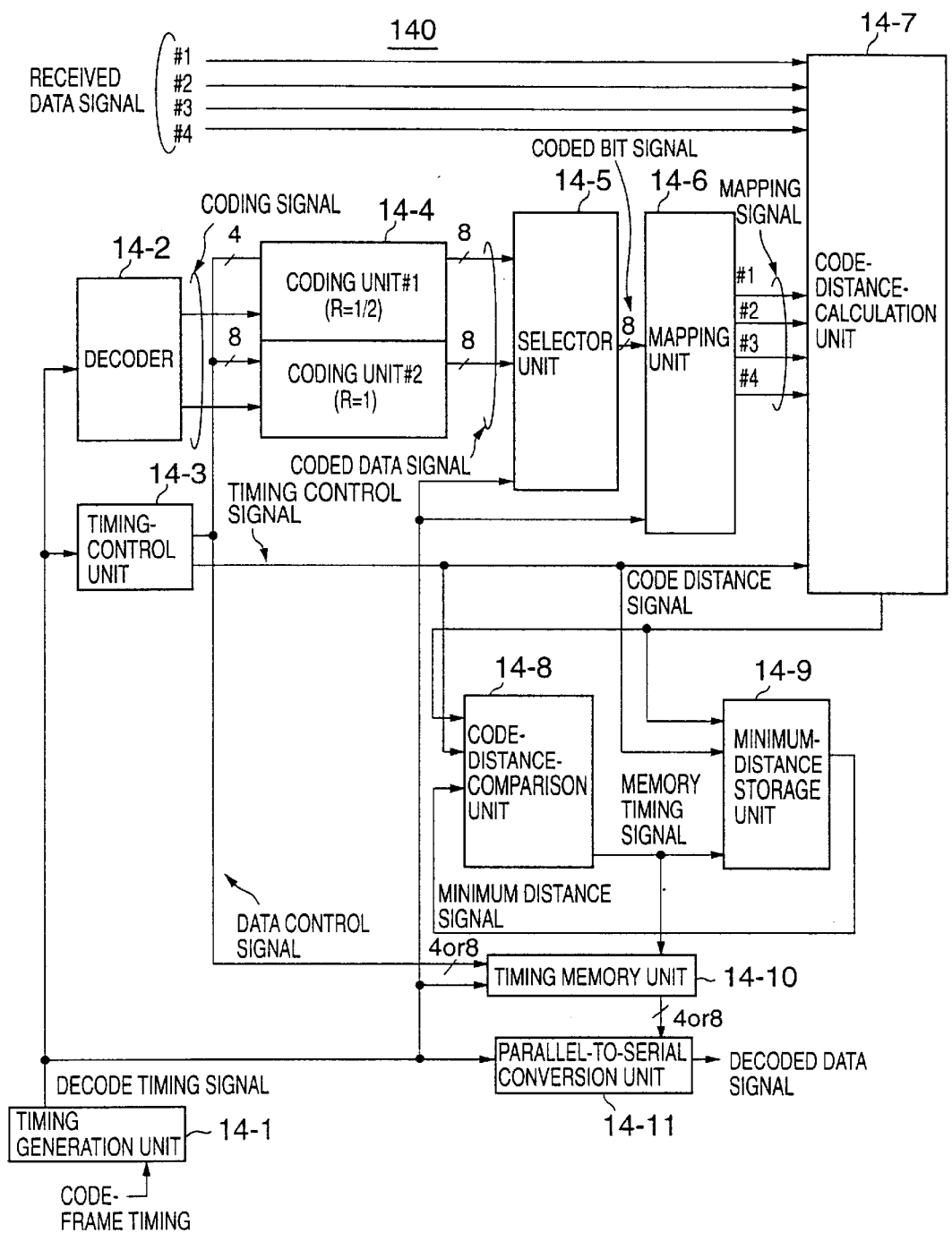
FIG. 14 is a simplified version of the first embodiment of a decoding device according to the present invention.

FIG. 14 is a simplified version of the first embodiment of a decoding device according to the present invention. The decoding device of FIG. 14 attends to decoding of received coded signals based on the maximum likelihood method, and may be used in combination with the coding device 90 of FIG. 9 or the coding device 110 of FIG. 11.

A decoding device 140 of FIG. 14 includes a timing generation unit 14-1, a decoder 14-2, a timing-control unit 14-3, two coding units 14-4, a selector unit 14-5, a mapping unit 14-6, a code-distance-calculation unit 14-7, a code-distance-comparison unit 14-8, a minimum-distance storage unit 14-9, a timing memory unit 14-10, and a parallel-to-serial conversion unit 14-11.

The decoding device 140 receives a code-frame timing signal and data signals (#1 through #4) with respect to four sub-carriers, and outputs a decoded data signal by decoding the received data signals.

Each element of the decoding device 140 operates in the same fashion as a corresponding element of the decoding device 70. It should be noted, however, that the first one of the coding units 14-4 has a 4-bit input, and the second one of the coding units 14-4 has a 8-bit input. Further, each of the coding units 14-4 outputs a coded data signal consisting of 8 bits. To be exact, the coding units 14-4 operate in the same fashion as the coding units 9-4 of the coding device 90 shown in FIG. 9.

Figure 15:
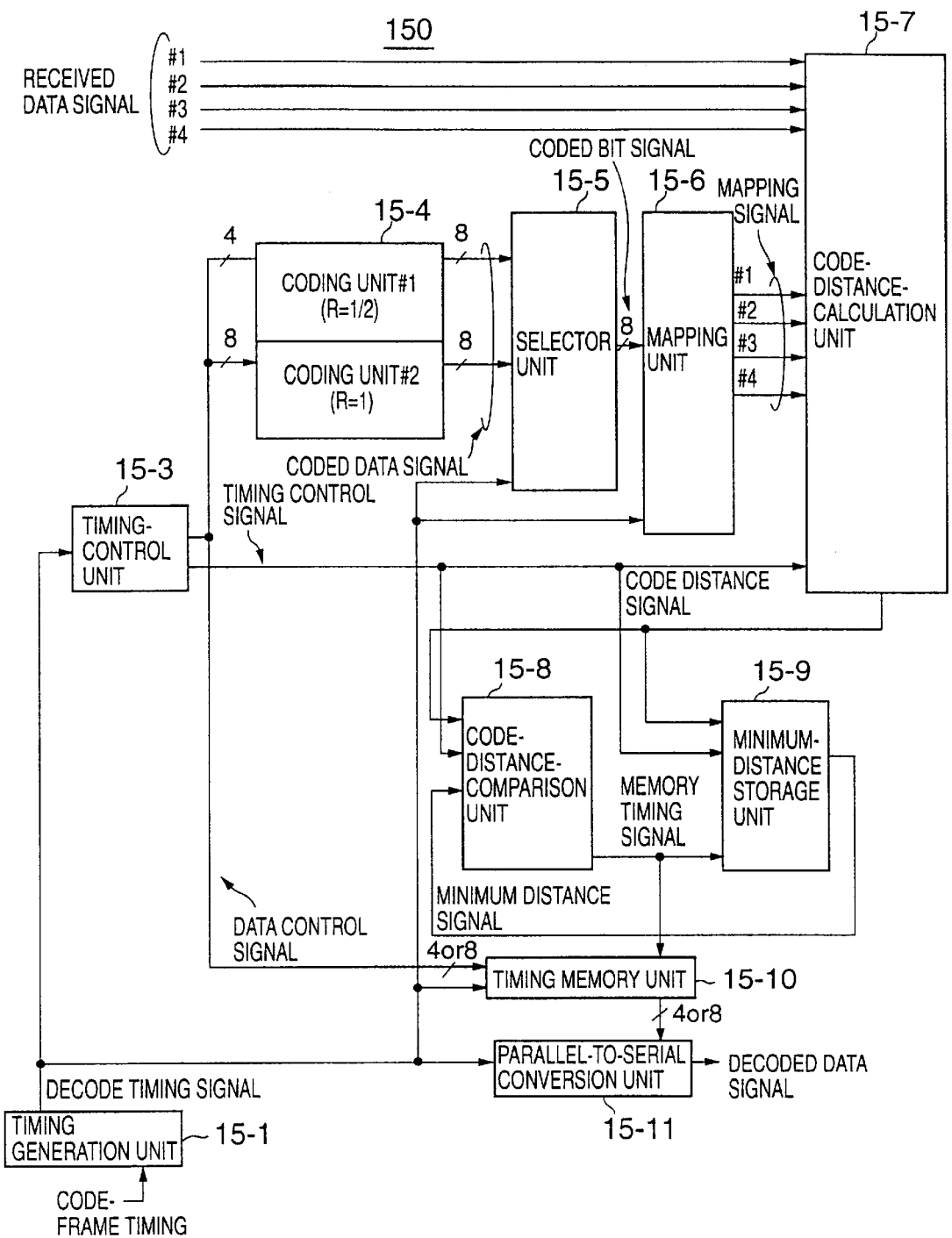
FIG. 15 is a simplified version of the second embodiment of a decoding device according to the present invention.

FIG. 15 is a simplified version of the second embodiment of a decoding device according to the present invention. The decoding device of FIG. 15 attends to decoding of received coded signals based on the maximum likelihood method, and may be used in combination with the coding device 90 of FIG. 9 or the coding device 110 of FIG. 11.

A decoding device 150 of FIG. 15 includes a timing generation unit 15-1, a timing-control unit 15-3, two coding units 15-4, a selector unit 15-5, a mapping unit 15-6, a code-distance-calculation unit 15-7, a code-distance-comparison unit 15-8, a minimum-distance storage unit 15-9, a timing memory unit 15-10, and a parallel-to-serial conversion unit 15-11.

The decoding device 150 receives a code-frame timing signal and data signals (#1 through #4) with respect to four sub-carriers, and outputs a decoded data signal by decoding the received data signals. Operation of each element is the same as the operation of a corresponding element of the decoding device 140 shown in FIG. 14, except for the coding units 15-4. The coding units 15-4 are in operation all the time, and do not receive the coding active/non-active signal.

Figure 16:
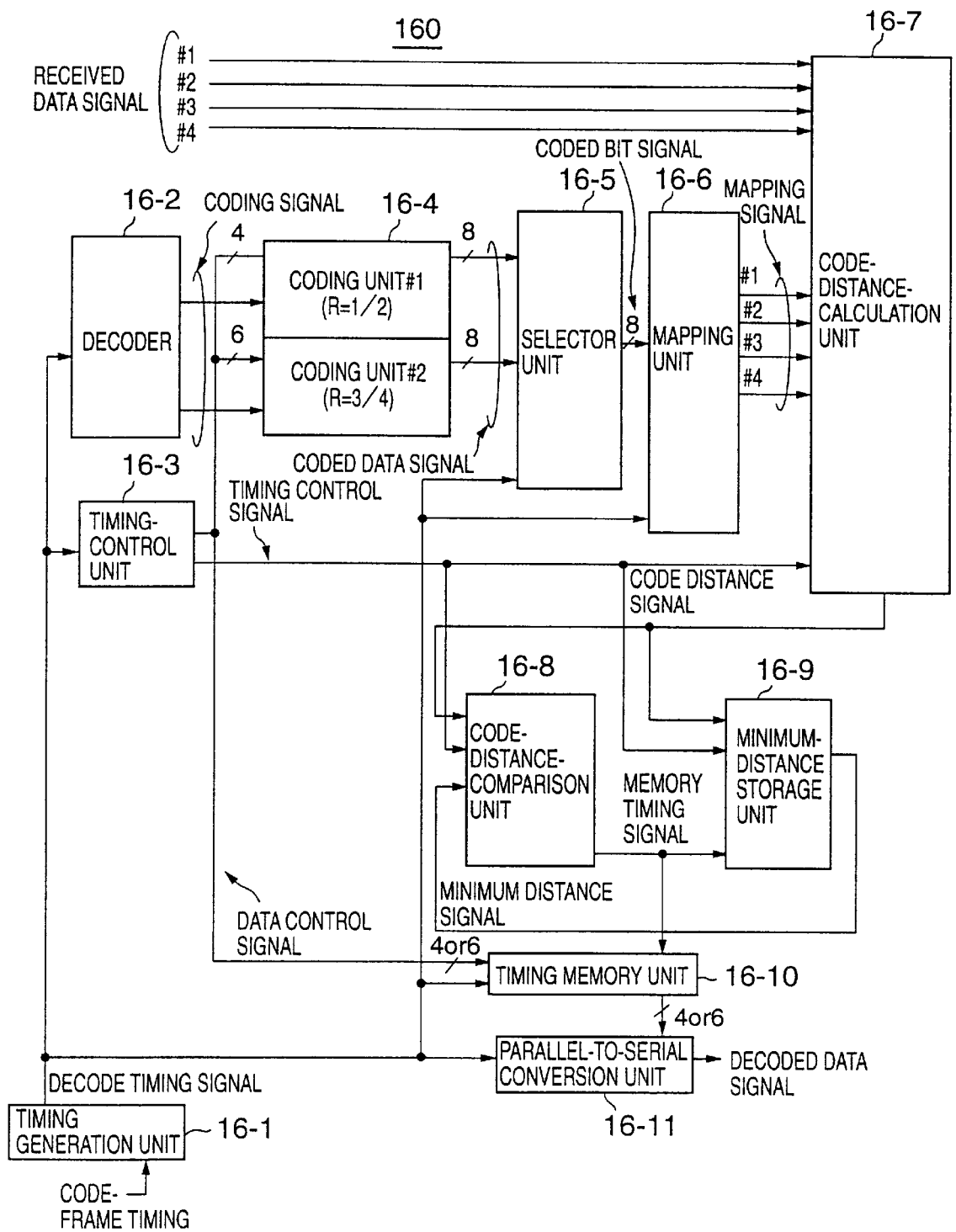
FIG. 16 is another simplified version of the first embodiment of a decoding device according to the present invention.

FIG. 16 is another simplified version of the first embodiment of a decoding device according to the present invention. The decoding device of FIG. 16 attends to decoding of received coded signals based on the maximum likelihood method, and may be used in combination with the coding device 120 of FIG. 12 or the coding device 130 of FIG. 13.

A decoding device 160 of FIG. 16 includes a timing generation unit 16-1, a decoder 16-2, a timing-control unit 16-3, two coding units 16-4, a selector unit 16-5, a mapping unit 16-6, a code-distance-calculation unit 16-7, a code-distance-comparison unit 16-8, a minimum-distance storage unit 16-9, a timing memory unit 16-10, and a parallel-to-serial conversion unit 16-11.

The decoding device 160 receives a code-frame timing signal and data signals (#1 through #4) with respect to four sub-carriers, and outputs a decoded data signal by decoding the received data signals.

Each element of the decoding device 160 operates in the same fashion as a corresponding element of the decoding device 140. It should be noted, however, that the first one of the coding units 16-4 has a 4-bit input, and the second one of the coding units 16-4 has a 6-bit input. Further, each of the coding units 16-4 outputs a coded data signal consisting of 8 bits. To be exact, the coding units 16-4 operate in the same fashion as the coding units 12-4 of the coding device 120 shown in FIG. 12.

Figure 17:
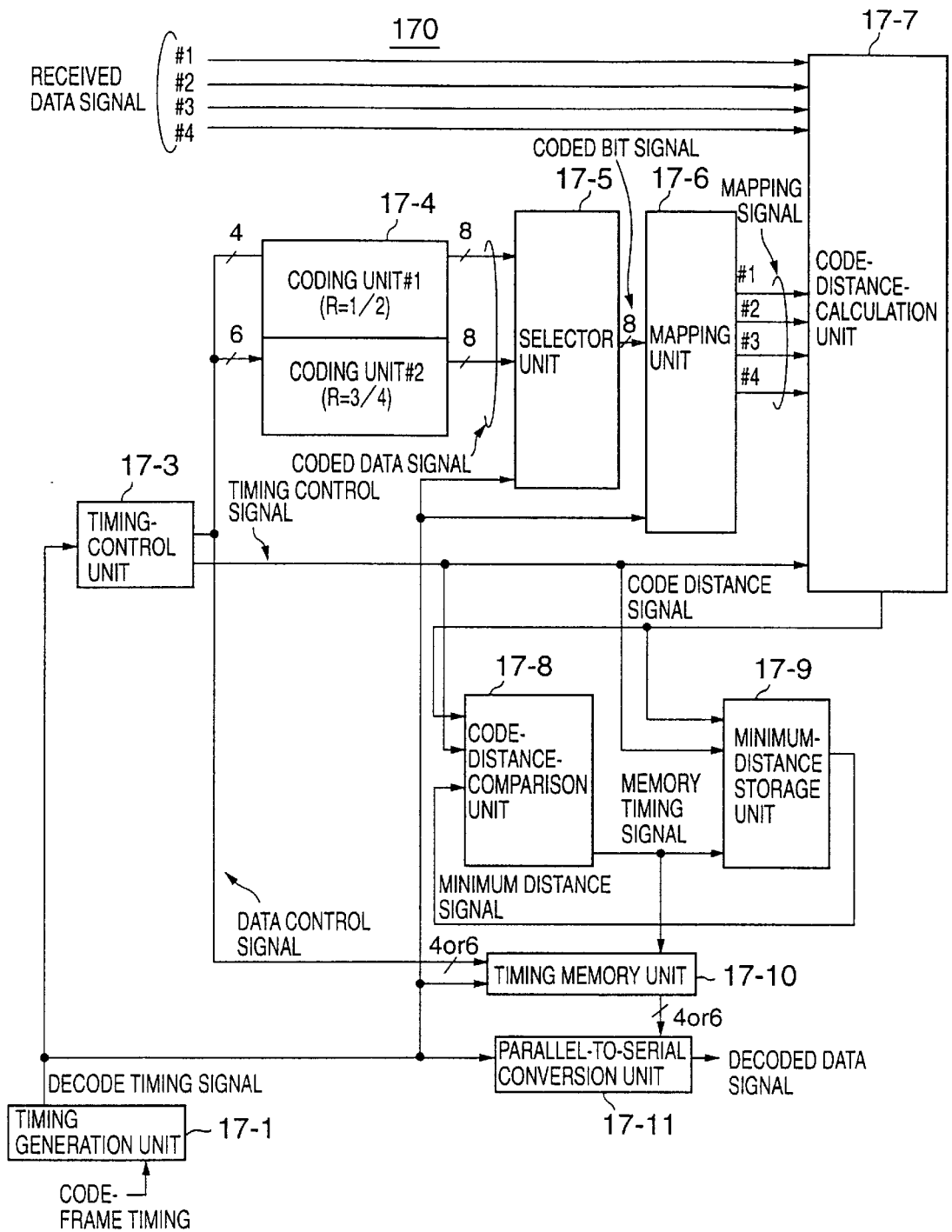
FIG. 17 is another simplified version of the second embodiment of a decoding device according to the present invention.

FIG. 17 is another simplified version of the second embodiment of a decoding device according to the present invention. The decoding device of FIG. 17 attends to decoding of received coded signals based on the maximum likelihood method, and may be used in combination with the coding device 120 of FIG. 12 or the coding device 130 of FIG. 13.

A decoding device 170 of FIG. 17 includes a timing generation unit 17-1, a timing-control unit 17-3, two coding units 17-4, a selector unit 17-5, a mapping unit 17-6, a code-distance-calculation unit 17-7, a code-distance-comparison unit 17-8, a minimum-distance storage unit 17-9, a timing memory unit 17-10, and a parallel-to-serial conversion unit 17-11.

The decoding device 170 receives a code-frame timing signal and data signals (#1 through #4) with respect to four sub-carriers, and outputs a decoded data signal by decoding the received data signals. Operation of each element is the same as the operation of a corresponding element of the decoding device 160 shown in FIG. 16, except for the coding units 17-4. The coding units 17-4 are in operation all the time, and do not receive the coding active/non-active signal.

Figure 18A:
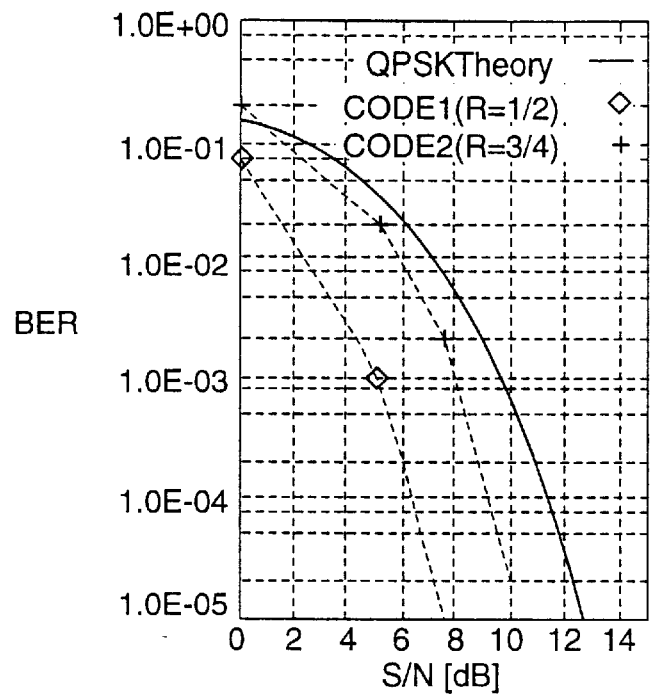
FIGS. 18A and 18B are charts showing bit-error-rate performance in relation to a S/N ratio according to the present invention.
Figure 18B:
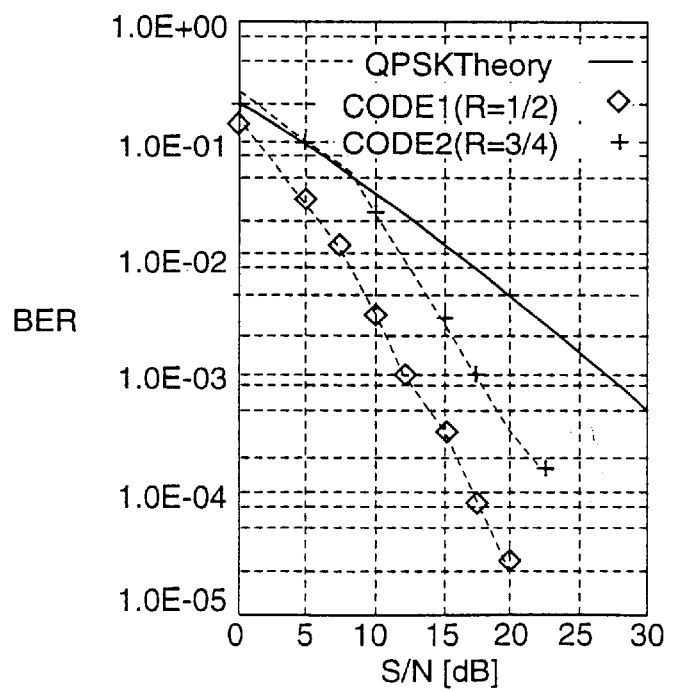
Figure 19A:
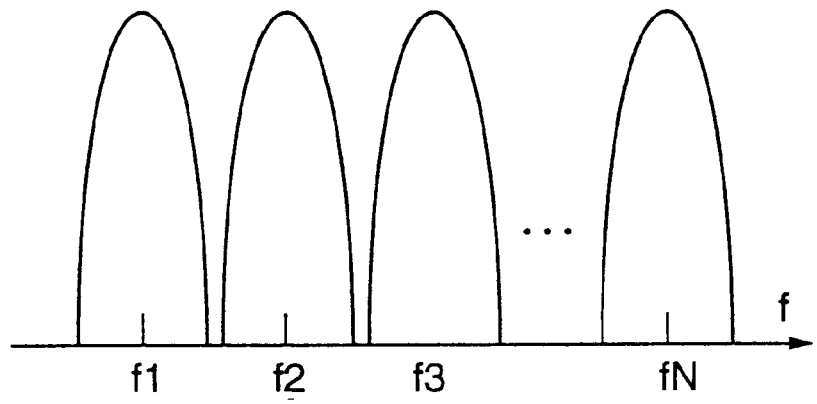
FIGS. 19A and 19B are illustrative drawings for explaining a multi-carrier transmission in the related art.
Figure 19B:
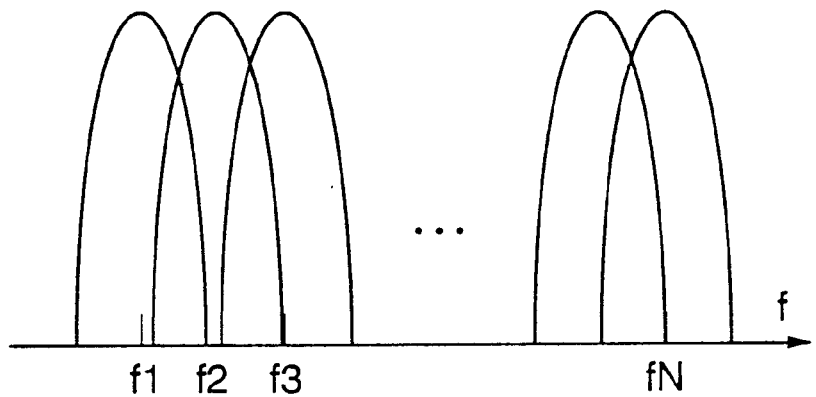

FIGS. 18A and 18B are charts showing bit-error-rate performance in relation to a S/N ratio according to the present invention.

The bit-error-rate characteristics shown in FIGS. 18A and 18B are those obtained when the coding device 120 of FIG. 12 or the coding device 130 of FIG. 13 is used. FIG. 18A shows the bit-error-rate performance in relation to the S/N ratio in a case where an AWGN channel is used. FIG. 18B illustrates the bit-error-rate performance in relation to the S/N ratio over a fading channel.

In the figures, CODE1 indicates the performance obtained by the first coding unit with the coding rate $R_1=1/2$, and CODE2 represents the performance obtained by the second coding unit with the coding rate $R_2=3/4$.

As shown in the figures, use of the two coding units achieves two different error rates. Under the condition of use of an AWGN channel, as shown in FIG. 18A, the BER differs by a factor of one hundred at a point where the S/N ratio is 7 dB. Under the fading environment, as shown in FIG. 18B, the BER differs by a factor of ten at a point where the S/N ratio is 15dB.

In the present invention, coding operation performed by the coding device is separate and independent between different multi-carrier symbols. This configuration does not require an interleaving, which leads to an increase in memory size and a decoding delay.

As described above, the present invention attends to coding of a varying code discriminating capacity, i.e., coding of a varying minimum code distance, for a code word having n signal points with respect to each multi-carrier-symbol duration, and successively change the minimum code distance in the multi-carrier transmission system using n sub-carriers, thereby providing different channel qualities within one data frame to achieve efficient transmission.

Further, codes having a reduced peak power are used in such coding, thereby achieving a reduction in peak power as well as providing different channel qualities.

Moreover, the coding device may be comprised of a timing generation unit, a serial-to-parallel conversion unit, a decoder, a desired number of coding units, a selector unit, and a mapping unit. In this configuration, the number of coding units is freely chosen to match the number of different channel qualities required in the system. Further, a variation of this configuration may be made by removing the decoder, thereby simplifying the circuit structure.

On the receiver side, coded data obtained by the coding scheme described above and having different minimum code distances are decoded based on the maximum likelihood method. Such a configuration achieves channel qualities that show reception performance differing by a factor of more than ten in a fading environment without use of an interleaver.

The decoding device for achieving the decoding scheme described above includes a timing generation unit, a decoder, a timing-control unit, coding units, a selector unit, a mapping unit, a code-distance-calculation unit, a code-distance-comparison unit, a minimum-distance storage unit, a timing memory unit, and a parallel-to-serial conversion unit. Use of this configuration makes it possible to cope with a desired number of channel qualities by simply changing the number of the coding units. Further, removal of the decoder from the decoding device makes it possible to implement a variation of the decoding device based on a simpler circuit structure.

Further, the present invention is not limited to these embodiments, but various variations and modifications may be made without departing from the scope of the present invention.

The present application is based on Japanese priority application No. 11-091884 filed on Mar. 31, 1999, with the Japanese Patent Office, the entire contents of which are hereby incorporated by reference.

What is claimed is:

1. A method of providing unequal error protection in a multi-carrier transmission which divides a transmission band into a plurality of carrier frequencies, each carrier frequency being modulated to transmit coded data, comprising the steps of:

coding data for a multi-carrier-symbol duration by a coding process of a given minimum code distance, said given minimum code distance being a minimum of a distance between two codewords that is measured in multidimensional code space with N sub-carriers, each of the sub-carriers having a different frequency; and changing the minimum code distance for each multi-carrier-symbol duration by changing the coding process.

2. The method as claimed in claim 1, wherein the coding process uses a set of codes such that multi-carrier-modulated signal corresponding to the set of codes has a peak power lower than a predetermined threshold.

3. A coding device for providing unequal error protection in a multi-carrier transmission which divides a transmission band into a plurality of carrier frequencies, each carrier frequency being modulated to transmit coded data, comprising:

a plurality of coding units, each of which codes a corresponding data frame of an information bit signal by a coding process of a given minimum code distance specific to a corresponding coding unit so as to output a coded bit signal;

a selector unit which successively selects one of said plurality of coding units, and outputs the coded bit signal supplied from the selected one of said plurality of coding units; and a mapping unit which maps the coded bit signal output from said selector unit to complex signals corresponding to sub-carriers, each of the sub-carriers having a different frequency.

4. The coding device as claimed in claim 3, further comprising:

a timing generation unit which generates a timing signal indicative of a timing of coding; and a serial-to-parallel conversion unit which converts the information bit signal from serial data to parallel data with respect to data frames thereof based on the timing signal, and supplies the parallel data to said plurality of coding units.

5. The coding device as claimed in claim 4, further comprising a decoder which generates active/non-active control signals based on the timing signal, wherein the control signals generated by said decoder activate only one of said plurality of coding units at a time.

6. A decoding device for decoding codes protected by unequal error protection and transmitted through a plurality of sub-carriers having a different frequency in a multi-carrier-transmission system which divides a transmission band into a plurality of carrier frequencies, each carrier frequency being modulated to transmit coded data, comprising a plurality of decoding units, which decode codes for a multi-carrier-symbol duration wherein a minimum code distance between two codewords that is measured in multidimensional code space with the plurality of sub-carriers differs for each decoding unit, said decoding units being configured to perform a maximum likelihood method to estimate transmitted codewords with respect to received data signal of said plurality of sub-carriers.

7. A decoding device for decoding received signals corresponding to a plurality of sub-carriers transmitted in a multi-carrier-transmission system, comprising:

a timing control unit which generates data control signals such that each of the data control signals varies over time to present various patterns within a corresponding multi-carrier-symbol duration;

a plurality of coding units, each of which codes a corresponding one of the data control signals by a coding process of a given minimum code distance specific to a corresponding coding unit so as to output a coded bit signal;

a mapping unit which maps the coded bit signal output from a selected one of said plurality of coding units to complex signals corresponding to the sub-carriers; and a code-distance-calculation unit which calculates a code distance between the complex signals and the received signals with respect to each of the various patterns of the corresponding one of the data control signals within a corresponding multi-carrier-symbol duration, wherein one of the various patterns providing a smallest code distance is selected as a decoding result of the corresponding received signals.

8. The decoding device as claimed in claim 7, further comprising:

a timing generation unit which generates a timing signal indicative of a timing of decoding; and a decoder which generates coding active/non-active control signals based on the timing signal, wherein the control signals generated by said decoder activate only one of said plurality of coding units at a time.

9. The decoding device as claimed in claim 7, further comprising a selector unit which successively selects one of said plurality of coding units, and supplies the coded bit signal of the selected one of said plurality of coding units to said mapping unit.

* * * * *